(12) United States Patent
Kazacos et al.

(10) Patent No.: US 7,976,974 B2
(45) Date of Patent: Jul. 12, 2011

(54) VANADIUM HALIDE REDOX FLOW BATTERY

(75) Inventors: Michael Kazacos, New South Wales (AU); Maria Skyllas-Kazacos, New South Wales (AU); Nicholas Kazacos, New South Wales (AU)

(73) Assignee: Newsouth Innovations Pty Limited, Sydney (AU)

( * ) Notice: Subject to any disclaimer, the term of this patent is extended or adjusted under 35 U.S.C. 154(b) by 0 days.

(21) Appl. No.: 12/843,521

(22) Filed: Jul. 26, 2010

(65) Prior Publication Data

US 2010/0291420 A1 Nov. 18, 2010

Related U.S. Application Data

(63) Continuation of application No. 10/548,555, filed as application No. PCT/AU2004/000310 on Mar. 14, 2003, now abandoned.

(30) Foreign Application Priority Data

Mar. 14, 2003 (AU) ................................ 2003901183
Apr. 14, 2003 (AU) ................................ 2003901763

(51) Int. Cl.
*H01M 8/20* (2006.01)
(52) U.S. Cl. ........................................ 429/105; 429/199
(58) Field of Classification Search .................. 429/105, 429/199
See application file for complete search history.

(56) References Cited

U.S. PATENT DOCUMENTS

| | | |
|---|---|---|
| 3,057,760 A | 10/1962 | Dereska et al. |
| 3,279,949 A | 10/1966 | Schaefer et al. |
| 3,996,064 A | 12/1976 | Thaller |
| 4,107,401 A | 8/1978 | Goodson et al. |
| 4,786,567 A | 11/1988 | Skyllas-Kazacos et al. |
| 5,368,762 A | 11/1994 | Sato et al. |
| 5,439,757 A | 8/1995 | Zito |
| 5,665,212 A | 9/1997 | Zhong et al. |
| 6,143,443 A | 11/2000 | Kazacos et al. |
| 6,562,514 B1 | 5/2003 | Kazacos et al. |
| 6,720,107 B1 | 4/2004 | Holtom et al. |

(Continued)

FOREIGN PATENT DOCUMENTS

EP 0 566 019 A1 10/1993

(Continued)

OTHER PUBLICATIONS

Kazacos "Novel vanadium chloride/polyhalide redox flow battery", J. Power Sources 124 (2003) pp. 299-302.*

(Continued)

*Primary Examiner* — Gregg Cantelmo
(74) *Attorney, Agent, or Firm* — Curatolo Sidoti Co., LPA; Joseph G. Curatolo; Vincent A. Cortese

(57) ABSTRACT

A vanadium halide redox cell including: a positive half cell containing a positive half cell solution including a halide electrolyte, a polyhalide complex, vanadium (IV) halide and vanadium (V) halide; a negative half cell containing a negative half cell solution including a halide electrolyte, vanadium (II) halide and vanadium (III) halide; wherein the ratio of the number of moles of polyhalide complex and vanadium (V): number of moles of vanadium (II) halide is about stoichiometrically balanced and wherein the ratio of the number of moles of polyhalide complex:the number of moles of vanadium (II) halide is in the range of from about 0.7:2 to about 1.3:2.

19 Claims, 14 Drawing Sheets

U.S. PATENT DOCUMENTS

| | | |
|---|---|---|
| 2004/0234843 A1 | 11/2004 | Skyllas-Kazacos |
| 2005/0244707 A1 | 11/2005 | Skyllas-Kazacos et al. |

FOREIGN PATENT DOCUMENTS

| | | |
|---|---|---|
| WO | WO 89/05528 A1 | 6/1989 |
| WO | WO 94/06164 A1 | 3/1994 |
| WO | WO 95/12219 A1 | 5/1995 |
| WO | WO 00/57507 A1 | 9/2000 |
| WO | WO 02/15317 A1 | 2/2002 |
| WO | WO 02/095855 A1 | 11/2002 |
| WO | WO 03/019714 A1 | 3/2003 |
| WO | WO 03/092138 A2 | 11/2003 |
| WO | WO 03/092138 A3 | 11/2003 |

OTHER PUBLICATIONS

Sum, et al., "A Study of the V(II)/V(III) Redox Couple for Redox Flow Cell Applications," Journal of Power Sources, 15, 1985, pp. 179-190.

Sum, et al., "Investigation of the V(V)/V(IV) System for Use in the Positive Half-Cell of a Redox Battery," Journal of Power Sources, 16, 1985, pp. 85-95.

M. Skyllas-Kazacos, et al., "Efficient Vanadiaum Redox Flow Cell"; Journal of the Electrochemical Society, vol. 135, No. 12, Dec. 1987 USA.

F. Grossmith, et al., "Evaluation of Membranes for All-Vanadium Redox Flow Cell"; Proceedings of the Symposia on "Stationary Energy Storage: Load Leveling and Remote Applications"; Proceedings vol. 88-11' pp. 363-374.

M. Kazacos, et al., "Vanadium Redox Cell Electrolyte Optimization Studies"; Journal of Applied Electrochemistry 20 (1990); pp. 463-467.

Börje Folkesson, "Chemically Regenerative Redox Fuel Cells II. Regeneration Reaction Studies"; Journal of Applied Electrochemistry 20 (1990); pp. 907-911.

Supplementary European Search Report, Form 150303.82, for European Patent Application No. EP 04 72 0553, Nov. 2008.

International Search Report, Form PCT/ISA/210, for International Patent Application No. PCT/AU2004/000310, Sep. 2005.

* cited by examiner

VANADIUM HALIDE REDOX FLOW BATTERY

CROSS REFERENCE TO RELATED APPLICATIONS

This application is a continuation application of U.S. Ser. No. 10/548,555, filed Apr. 6, 2006, now abandoned, which is a national stage application of International Application No. PCT/AU2004/000310, filed Mar. 15, 2004, which claims the benefit of Application No. AU 2003901183, filed Mar. 14, 2003 and Application No. AU 2003901763, filed Apr. 14, 2003, from which applications priority is claimed, and which are incorporated by reference herein.

TECHNICAL FIELD

Disclosed is a vanadium halide redox flow cell employing a 50:50 vanadium(III)/(IV) halide solution as the initial feed electrolyte solution in both the positive and negative half cells. Also disclosed is the 50:50 V(III)/V(IV) halide feed solution for use in the positive and negative half-cells of the vanadium halide redox flow cell. A vanadium halide redox flow cell is also disclosed in which the initial feed solution for the negative half-cell is a vanadium (III) halide electrolyte and in which a vanadium (IV) halide electrolyte is used as feed solution for the positive half-cell. Methods of producing the vanadium (III), vanadium (IV) and vanadium (III)/(IV) halide electrolytes for the vanadium halide redox flow cell are also disclosed. In addition, a method of producing electricity by discharging the fully charged or partially charged vanadium halide redox flow cell or battery is disclosed, as well as methods of recharging the discharged or partially discharged vanadium halide redox flow cell or battery.

Also disclosed is a high energy density vanadium halide redox flow cell employing a 2:1 ratio of vanadium(III) halide and vanadium (IV) halide in the initial feed electrolyte solution for both the positive and negative half cells, wherein the volume of the positive half-cell solution is half the volume of the negative half-cell solution. A high energy density vanadium halide redox flow cell is also disclosed in which the initial feed solution for the negative half-cell is a vanadium (III) halide electrolyte and that for the positive half-cell is a 50:50 vanadium (III)/vanadium (IV) halide electrolyte, wherein the volume of the positive half-cell electrolyte is half that of the negative half-cell. Methods of producing the vanadium (III)/(IV) halide electrolytes for the high energy density vanadium halide redox flow cell are also disclosed.

An immobilised or gelled electrolyte vanadium halide redox cell is also disclosed as well as the method of immobilising the vanadium halide redox cell electrolyte. In addition, a method of producing electricity by discharging the fully charged or partially charged vanadium halide redox flow cell or battery or the gelled electrolyte cell or battery is disclosed, as well as methods of recharging the discharged or partially discharged vanadium halide redox flow cell or battery or immobilised redox cell or battery.

BACKGROUND

The factors that determine the energy density of a redox flow battery are the concentration of the redox ions in solution, the cell potential and the number of electrons transferred during discharge per mole of active redox ions. In the case of the all-vanadium redox flow cell, the maximum vanadium ion concentration that can be employed for wide temperature range operation is typically 2 M or less. This concentration represents the solubility limit of the V(II) and/or V(III) ions in the sulphuric acid supporting electrolyte at temperatures below 5° C. and the stability of the V(V) ions at temperatures above 40° C.

The use of a vanadium (IV) bromide solution in both half-cells of an all vanadium bromide redox flow cell was described in Australian patent application PS1921 "Vanadium Bromide Redox Flow Battery" and PCT Application, PCT/GB2003/001757 "Metal Bromide Redox Flow Cell". This system involves the use of a solution of 0.1 to 5 M vanadium (IV) bromide in HBr/HCl mixtures in both the positive and negative half-cell electrolytes, thereby overcoming the problem of cross-contamination of the two half-cell solutions. The higher solubility of V(II) and V(III) bromide in this systems allows much higher energy densities to be achieved compared with the vanadium sulphate based redox flow cell.

In Australian patent application PS1921 "Vanadium Bromide Redox Flow Battery" and PCT Application, PCT/GB2003/001757 "Metal Bromide Redox Flow Cell", a V(IV) bromide solution is used in equal volumes in both half-cells. In these patents, it was proposed that during the initial charge cycle, the V(IV) ions are first oxidised to V(V), followed by the oxidation of the $Br^-$ to $Br_3^-$ or $Br_2Cl^-$ in the positive half-cell, while V(IV) is reduced by a 2-electron process to $V^{2+}$ in the negative half-cell. Subsequent charge-discharge cycling involves the one-electron $V^{2+}/V^{3+}$ oxidation-reduction reaction in the negative half-cell and the $Br^-/Br_3^-$ redox reactions in the positive half-cell.

Further investigations by the inventors, have however revealed that V(IV) is not oxidised to V(V) to any appreciable extent in the presence of the high bromide ion concentration required to stabilise the bromine produced at the positive electrode, so that during the initial charge cycle, the positive electrolyte must undergo oxidation of two moles of $Br^-$ ions for every mole of V(IV) reduced to $V^{2+}$ at the negative electrode. Similarly, on discharge, the $V^{2+}$ ions are oxidised to $V^{3+}$ by a one-electron reduction process, so only half of the formed bromine is converted back to the original $Br^-$ form during the discharge cycle. This means that the positive half-cell electrolyte always contains excess bromine or the relatively unstable $Br_3^-$ or $Br_2Cl^-$ species that could give rise to bromine gas emission problems during operation of the vanadium bromide battery. Furthermore, the presence of excess bromine in the positive half-cell electrolyte increases the corrosive properties of this solution, reducing the life of the cell components.

It is therefore desirable to alter the composition of the feed electrolyte for the vanadium halide redox flow cell to avoid the production of excess bromine during cell operation. It is also desirable to alter the electrolyte production process to avoid generation of excess bromine during electrolyte preparation.

The inventors have also discovered that by further adjusting the composition of the initial feed solution for both half-cells of the vanadium halide redox cell, it is possible to halve the volume of the positive half-cell solution and still achieve the same capacity during cycling. This would allow a 25% decrease in the volume and weight of the electrolytes, thereby increasing the energy density and specific energy of the vanadium halide system by up to 25%, providing an important benefit for mobile applications in particular.

The inventors have further found that by complexing, immobilising or gelling the vanadium halide cell electrolytes, it is possible to stabilise the bromine produced, so that a greater fraction of the bromide ions can be oxidised during charging in the positive half-cell electrolyte without significant bromine loss.

SUMMARY OF THE INVENTION

According to a first aspect of this invention there is provided a prior to charge vanadium halide redox cell comprising:

a positive half cell containing a positive half cell solution comprising a halide electrolyte, vanadium (III) halide and vanadium (IV) halide;

a negative half cell containing a negative half cell solution comprising a halide electrolyte, vanadium (III) halide and vanadium (IV) halide;

wherein the amounts of vanadium (III) halide, vanadium (IV) halide and halide ions in the positive and negative half cell solutions are such:

that in a first charging step comprising charging the prior to charge vanadium halide redox cell, a vanadium halide redox cell having a state of charge selected from the group consisting of a zero state of charge and a near zero state of charge comprising predominantly vanadium (IV) halide in the positive half cell solution and predominantly V(III) halide in the negative half cell solution can be prepared.

Predominantly may be taken to mean 100 molar % of the total vanadium ion concentration or between 80% and 100%, 85% and 100%, 90% and 100%, 93% and 100%, 95% and 100%, 97% and 100%, 98% and 100% or 99% and 100% of the total vanadium ion concentration in the particular solution.

The positive half cell may comprise a positive electrode and the negative half cell may comprise a negative electrode. The redox cell may comprise an ionically conducting separator disposed between the positive and negative half cells and in contact with the positive and negative half cell solutions. The ionically conducting separator may be a membrane or other suitable separator.

In the prior to charge vanadium halide redox cell the amounts of vanadium (III) halide, vanadium (IV) halide and halide ions in the positive and negative half cell solutions may be such:

that in a second charging step comprising charging the zero state of charge vanadium halide redox cell, a charged vanadium halide redox cell comprising a polyhalide complex in the positive half cell solution and vanadium (II) halide in the negative half cell solution can be prepared.

The positive half cell solution may comprise vanadium (III) halide and vanadium (IV) halide in a V(III):V(IV) molar ratio of from about 0.9:1 to about 6:1 in the halide electrolyte and the negative half cell solution comprises vanadium (III) halide and vanadium (IV) halide in a V(III):V(IV) molar ratio of from about 0.8:1 to 6:1 or from 0.9:1 to about 6:1 or from about 0.95:1 to about 6:1 or from about 0.98:1 to about 6:1 or from about 0.99:1 to about 6:1 or from about 1:1 to about 6:1 or from about 1.01:1 to about 6:1 or from about 1.02:1 to about 6:1 or from about 1.03:1 to about 6:1 or from about 1.04:1 to about 6:1 or from about 1.05:1 to about 6:1 or from about 1.1:1 to about 6:1 or from about 1.5:1 to about 6:1 or from about 1.75:1 to about 6:1 or from about 2:1 to about 6:1 or from about 2.25:1 to about 6:1 or from about 2.5:1 to about 6:1 or from about 0.9:1 to about 5.5:1 or from about 0.9:1 to about 5:1 or from about 0.9:1 to about 4.75:1 or from about 0.9:1 to about 4.5:1 or from about 0.9:1 to about 4:1 or from about 0.9:1 to about 3.75:1 or from about 0.8:1 to about 3.5:1 or from about 0.9:1 to about 3.5:1 or from about 0.9:1 to about 3:1 or from about 0.8:1 to about 3:1 or from about 0.9:1 to about 2.5:1 or from about 0.8:1 to about 2.5:1 or from about 0.9:1 to about 2:1 or from about 1:1 to about 2:1 or from about 1.1:1 to about 2:1 and the volume of the negative half cell solution:the volume of the positive half cell solution may be equal to or about equal to the V(III):V(IV) molar ratio.

The V(III):V(IV) molar ratio may be about 1:1 and the volume of the negative half cell solution:the volume of the positive half cell solution may be about 1:1.

The V(III):V(IV) molar ratio may be about 2:1 and the volume of the negative half cell solution:the volume of the positive half cell solution may be about 2:1.

The halide may be selected from the group consisting of bromide and a combination of bromide and chloride.

The total halide ion concentration may be at least 3 times the total vanadium ion concentration. The total halide concentration may be 3, 3.5, 4, 4.5, 5, 5.5, 6, 6.5, 7, 7.5, 8, 8.5, 9, 9.5, 10 or 10.5 times the total vanadium ion concentration. The total halide concentration may be in the range 3-10.5 or 3-10 or 3-9 or 3-8 or 3-7 or 3-6 or 3-5 or 3-4 times the total vanadium ion concentration.

The halide may be selected from the group consisting of bromide and a combination of bromide and chloride where the concentration of bromide ions is greater than the concentration of chloride ions and where the total halide ion concentration is at least 3 times the total vanadium ion concentration.

According to a second aspect of this invention there is provided a vanadium halide redox cell which is at a state of charge selected from the group consisting of a zero state of charge and a near zero state of charge comprising:

a positive half cell containing a positive half cell solution comprising a halide electrolyte and a vanadium halide which is predominantly vanadium (IV) halide;

a negative half cell containing a negative half cell solution comprising a halide electrolyte and a vanadium halide which is predominantly vanadium (III) halide;

wherein the amount of vanadium (IV) halide in the positive half cell solution and the amount of vanadium (III) halide in the negative half cell solution are such that the vanadium halide redox cell is at a state of charge selected from the group consisting of a zero state of charge and a near zero state of charge.

A near zero state of charge includes a state of charge in the range of between +20% and −20%, +15% and −15%, +10% and −10%, +5% and −5%, +3% and −3%, +2% and −2% or +1% and −1% of a state of zero charge.

The positive half cell solution may not include a significant amount of polyhalide complex at zero state of charge or near zero state of charge.

According to a third aspect of this invention there is provided a vanadium halide redox cell which is fully charged comprising:

a positive half cell containing a positive half cell solution comprising a halide electrolyte, a polyhalide complex, vanadium (IV) halide and vanadium (V) halide;

a negative half cell containing a negative half cell solution comprising a halide electrolyte and vanadium (II) halide;

wherein the molar concentration of vanadium (V) and polyhalide complex:molar concentration of vanadium (II) halide is about stoichiometrically balanced.

According to a fourth aspect of this invention there is provided a vanadium halide redox cell which is partially charged comprising:

a positive half cell containing a positive half cell solution comprising a halide electrolyte, a polyhalide complex, vanadium (IV) halide and vanadium (V) halide;

a negative half cell containing a negative half cell solution comprising a halide electrolyte, vanadium (II) halide and vanadium (III) halide;

wherein the number of moles of polyhalide complex and vanadium (V):number of moles of vanadium (II) halide is about stoichiometrically balanced.

In the third and fourth aspects the number of moles of polyhalide complex: the number of moles of vanadium (II) halide may be about 1:2.

In the third and fourth aspects the number of moles of polyhalide complex:the number of moles of vanadium (II) halide may be in the range of from about 0.7:2 to about 1.3:2.

In the third and fourth aspects the polyhalide complex forms a halide/polyhalide redox couple. The halide/polyhalide redox couple may be $Br_3^-/Br^-$, $ClBr_2/Br^-$ or $BrCl_2^-/Cl^-$, for example. Further examples of halide/polyhalide redox couples are described in PCT/AU02/01157 incorporated by reference.

In the first to fourth aspects the halide may be selected from the group consisting of bromide and a combination of bromide and chloride.

In the first to fourth aspects the total halide ion concentration may be at least 3 times the total vanadium ion concentration. The total halide concentration may be 3, 3.5, 4, 4.5, 5, 5.5, 6, 6.5, 7, 7.5, 8, 8.5, 9, 9.5, 10 or 10.5 times the total vanadium ion concentration. The total halide concentration may be in the range 3-10.5 or 3-10 or 3-9 or 3-8 or 3-7 or 3-6 or 3-5 or 3-4 times the total vanadium ion concentration.

In the first to fourth aspects the halide may be selected from the group consisting of bromide and a combination of bromide and chloride where the concentration of bromide ions is greater than the concentration of chloride ions and where the total halide ion concentration is at least 3 times the total vanadium ion concentration.

In the first to fourth aspects the positive half cell may comprise a positive electrode and the negative half cell may comprise a negative electrode. The positive electrode is in contact with the positive half cell solution and the negative electrode is in contact with the negative half cell solution. The redox cell may comprise an ionically conducting separator disposed between the positive and negative half cells and in contact with the positive and negative half cell solutions. The ionically conducting separator may be a membrane or other suitable separator.

In the first to fourth aspects the redox cells may be operated over a wide temperature range such as in one of the following temperature ranges −10 to 99, 0 to 99 1 to 99, 5 to 95, 5 to 90, 5 to 75, 5 to 70, 5 to 65, 5 to 60, 5 to 55, 5 to 50, 5 to 45, 0 to 45, −10 to 45, 5 to 40, 0 to 40, −10 to 40, 5 to 35, 0 to 35, −10 to 35, 5 to 30, 0 to 30, 5 to 25, 5 to 20, 10 to 50, 15 to 50, 18 to 50, 15 to 40, 15 to 35 degrees centigrade.

In the first to fourth aspects the halide electrolyte may also contains a complexing agent for the bromine produced during charging.

In the first to fourth aspects the halide electrolyte may be immobilised or gelled. A suitable immobilising agent or gelling agent is fumed silica.

In the first to fourth aspects the redox cell may be a stirred or agitated redox cell or a static redox cell or a flow redox cell or other suitable redox cell such as an immobilised redox cell or a gelled redox cell or other redox cell. Throughout the specification the term redox cell may also be referred to as a redox battery.

According to a fifth aspect of this invention there is provided a method for producing an electrolyte for a vanadium halide redox cell comprising:

dissolving a V(III) compound and a V(V) compound in an approximately 3:1 molar ratio in a solution of HBr, LiBR, NaBr, KBr or mixtures thereof to produce an approximately 50:50 mixture of VIII) and V(IV) ions in the solution. The V(III) compound may be $V_2O_3$ and the V(V) compound may be $V_2O_5$.

In a particular form there is provided a method for producing an electrolyte for a vanadium bromide redox cell involving the mixing of a V(III) compound with a V(V) compound in a 3:1 molar ratio in a solution of HBr, NaBr, KBr or mixtures thereof and stirring until fully dissolved to produce an approximately 50:50 mixture of V(III) and V(IV) ions. To avoid excessive bromine generation, the V(III) compound is added to the halide solution first and allowed to partially dissolve before addition of the V(V) compound. The dissolution may be at room temperature or at a temperature ranging from room temperature to boiling temperature. Approximately equal volumes of the solution produced is added to both half-cells of the prior to charge vanadium halide redox cell.

According to a sixth aspect of this invention there is provided a method for producing an electrolyte for a vanadium halide redox cell comprising:

dissolving equimolar amounts of a V(III) compound and a V(IV) compound in a solution of HBr, LiBr, NaBr, KBr or mixtures thereof to produce an approximately 50:50 mixture of V(III) and V(IV) ions.

The V(III) compound may be $V_2O_3$ and the V(IV) compound may be $V_2O_4$.

The solution may also contains chloride ions.

According to a seventh aspect of this invention there is provided a method for producing an electrolyte for a vanadium halide redox cell comprising:

dissolving a V(III) compound and a V(V) compound in a 4.5:1 molar ratio in a solution of HBr, LiBr, NaBr, KBr or mixtures thereof to produce a 2:1 mixture of V(III) and V(IV) ions.

The V(III) compound may be $V_2O_3$ and the V(V) compound may be $V_2O_5$. To avoid excessive bromine generation, the V(III) compound is added to the halide solution first and allowed to partially dissolve before addition of the V(V) compound. The dissolution may be at room temperature or at a temperature ranging from room temperature to boiling temperature. The solution produced is added to both half-cells of the prior to charge vanadium halide redox cell, the ratio of the positive half-cell solution to the negative half-cell solution being approximately 1:2.

According to an eighth aspect of this invention there is provided a method for producing an electrolyte for a vanadium halide redox cell comprising:

dissolving a 2:1 molar ratio of a V(III) compound and a V(IV) compound in a solution of HBr, LiBr, NaBr, KBr or mixtures thereof to produce a 2:1 mixture of V(III) and V(IV) ions.

The V(III) compound may be $V_2O_3$ and the V(IV) compound may be $V_2O_4$.

In the fifth to eighth aspects of the invention the total vanadium ion concentration may be between 0.5 and 5 M, 0.75 and 5 M, 1 and 5 M, 1.25 and 5 M, 1.5 and 5 M, 1.75 and 5 M, 1.9 and 5 M, 2 and 5 M, 2.1 and 5 M, 2.25 and 5 M, 2.3 and 5 M, 2.4 and 5 M, 2.5 and 5 M, 2.7 and 5 M, 3 and 5 M, 3.5 and 5 M, 4 and 5 M, 1 and 4.5 M, 1 and 4 M, 1 and 3.5 M, 1 and 3 M, 1 and 2.75 M, 1 and 2.5 M, 1 and 2.25 M, 1 and 2, 1.8 and 2.75 M, 1.8 and 2.5 M, 1.8 and 2.4 M, 1.8 and 2.3 M, 1.8 and 2.2 M or 1.9 and 2.1 M and the total bromide ion concentration may be between 2 and 12 M. there may be bromide ions or a mixture of bromide and chloride ions. The total halide ion concentration (which may be bromide ions or a mixture of bromide and chloride ions) at least 3 times the total vanadium ion concentration. In the case where there is a mixture of bromide and chloride ions the concentration of bromide ions is greater than the concentration of chloride ions.

The electrolyte may be HBr and the total bromide ion concentration may be 2 to 12M.

The electrolyte may also contain chloride ions at a concentration of 0.5 to 3 M.

In one particular form of the invention there is provided vanadium bromide or vanadium bromide/chloride redox flow cell (also referred to as a vanadium halide redox flow cell) employing a solution of vanadium (III) bromide or vanadium (III) bromide/chloride in the negative half-cell and vanadium (IV) bromide or vanadium (IV) bromide/chloride in the positive half-cell.

An approximately 50:50 mixture of vanadium (III) and vanadium (IV) bromide may be used in both half-cells.

The negative half-cell electrolyte may also contain V(II), V(III) and/or V(IV) ions in a supporting electrolyte of HBr, NaBr, KBr or mixtures thereof and where the positive electrolyte contains a bromide/polyhalide couple in the presence of V(IV) and/or V(V) ions.

The charged or partially charged negative half-cell electrolyte may contain $VBr_2$, and/or $VBr_3$ in a supporting electrolyte selected from the group HBr, LiBr, NaBr, KBr, HCl, NaCl, KCl or mixtures thereof.

The negative half cell electrolyte solution may comprise 0.5 to 5 M $VBr_3$ and/or $VBr_2$ in 0.1 to 10 M HBr or HCl/HBr or NaCl/HBr or KCl/HBr mixtures The charged or partially charged positive half-cell electrolyte may contain redox couples selected from the group $Br^-/Br_3^-$, $Br^-/BrCl_2^-$, $Br^-/Br_2Cl^-$ or mixtures thereof.

The positive half-cell electrolyte solution may include vanadium ions in a mixture of $Cl^-$ and $Br^-$ of total concentration 1 to 12 M.

The positive half-cell electrolyte may include vanadium ions in a solution containing 0.5 to 5 M polyhalide ions such as, for example, $Br_3^-$ or $Br_2Cl^-$ ions or mixtures thereof (for a more detailed list of polyhalide ions particularly polybromide, polychloride and polybromide/chloride ions see PCT/AU02/01157 the contents of which are incorporated herein by cross reference).

The redox flow cell may comprise a negative half-cell may comprise a solution of V(III) and/or V(IV) ions in a supporting electrolyte selected from the group comprising HBr, NaBr, KBr or mixtures thereof and a positive half-cell with a solution of V(IV) and/or V(V) ions in a supporting electrolyte selected from the group comprising HBr, NaBr, KBr or mixtures thereof.

The positive and negative half-cell electrolytes may also contain chloride ions at a concentration of 0.1 to 5 M.

A partially charged negative half-cell electrolyte solution for the vanadium halide redox flow cell may comprise 0.5 to 5 M $VBr_2$ and/or $VBr_3$ in a supporting electrolyte of HBr, NaBr, KBr or mixtures thereof.

The negative half-cell electrolyte solution may also contain $Cl^-$ ions at a concentration of 0.1 to 5 M.

In the negative half-cell electrolyte an excess bromide and chloride ion concentration may be in the range selected from the group consisting of 0.1 to 10 M and 0.1 to 5 M.

A discharged or partially charged positive half-cell electrolyte solution for the vanadium halide redox flow cell may comprise V(IV) and/or V(V) ions in a supporting electrolyte of HBr, NaBr, KBr or mixture thereof.

The positive half-cell electrolyte solution may also contain 0.5 to 5 M vanadium ions in a mixture of 0.5 to 12 M bromide and chloride ions.

In another form there is provided a method for producing the electrolyte for a vanadium halide redox flow cell involving the mixing of equimolar amounts of a V(III) compound with a V(IV) compound in a solution of HBr, NaBr, NaBr, KBr or mixtures thereof and stirring until fully dissolved to produce an approximately 50:50 mixture of V(III) and V(IV) ions.

The V(III) compound may be $V_2O_3$ and the V(IV) compound may be $V_2O_4$.

The solution may also contains chloride ions. The total bromide ion concentration may be greater than the total chloride ion concentration.

In a further form there is provided a high energy density vanadium halide redox flow cell employing an initial feed solution of approximately 2 to 1 molar ratio of vanadium (III) bromide and vanadium (IV) bromide in both half-cells wherein the positive half-cell electrolyte volume is approximately half the negative half-cell electrolyte volume.

In another form there is provided a method for producing an electrolyte for a high energy vanadium bromide redox flow cell involving the mixing of a V(III) compound with a V(V) compound in a 4.5:1 molar ratio in a solution of HBr, NaBr, KBr or mixtures thereof and stirring until fully dissolved to produce an approximately 2:1 mixture of V(III) and V(IV) ions.

The V(III) compound may be $V_2O_3$ and the V(V) compound may be $V_2O_5$. To avoid excessive bromine generation, the V(III) compound is added to the halide solution first and allowed to partially dissolve before addition of the V(V) compound. The dissolution may be at room temperature or at a temperature ranging from room temperature to boiling temperature or from room temperature to 80° C.

In a further form there is provided a method for producing the electrolyte for a vanadium halide redox flow cell involving the mixing of 2:1 molar ratio of a V(III) compound and a V(IV) compound in a solution of HBr, NaBr, KBr or mixtures thereof and stirring until fully dissolved to produce an approximately 2:1 mixture of V(III) and V(IV) ions.

The V(III) compound may be $V_2O_3$ and the V(IV) compound may be $V_2O_4$.

The total vanadium ion concentration may be between 0.5 and 5 M and the halide may be bromide or bromide/chloride total bromide ion or bromide/chloride ion concentration may be between 2 and 12 M.

The supporting electrolyte may be HBr and the total bromide ion concentration may be 8 to 12 M.

The solution may also contain chloride ions at a concentration of 0.5 to 3 M.

In a ninth aspect of this invention there is provided a process of partially charging a prior to charge vanadium halide redox cell of the first aspect comprising providing electrical energy to a positive electrode in the positive half cell and a negative electrode in the negative half cell to derive trivalent vanadium ions in the negative half cell solution and tetravalent vanadium ions in the positive half cell solution.

After the partially charging process of the ninth aspect the redox cell may be at zero state of charge or near zero state of charge. After the partially charging process of the ninth aspect the electrolyte in the redox cell may not contain a polyhalide complex.

According to a tenth aspect of this invention there is provided a process of charging a prior to charge vanadium halide redox cell of the first aspect comprising providing electrical energy to a positive electrode in the positive half cell and a negative electrode in the negative half cell to derive divalent vanadium ions in the negative half cell solution and tetravalent vanadium ions, pentavalent vanadium ions and a halide/polyhalide redox couple in the positive half cell solution.

After the charging process of the tenth aspect the redox cell may be partially charged or fully charged.

According to an eleventh aspect of this invention there is provided a process of charging a zero state of charge or near zero state of charge vanadium halide redox cell of the second aspect comprising providing electrical energy to a positive electrode in the positive half cell and a negative electrode in the negative half cell to derive divalent vanadium ions in the negative half cell solution and tetravalent vanadium ions, pentavalent vanadium ions and a halide/polyhalide redox couple in the positive half cell solution.

After the charging process of the eleventh aspect the redox cell may be partially charged or fully charged.

According to a twelfth aspect of this invention there is provided a process of charging a partially charged vanadium halide redox cell of the third aspect comprising providing electrical energy to a positive electrode in the positive half cell and to a negative electrode in the negative half cell to derive divalent vanadium ions in the negative half cell solution and tetravalent vanadium ions, pentavalent vanadium ions and a halide/polyhalide redox couple in the positive half cell solution.

After the charging process of the twelfth aspect the redox cell may be partially charged or fully charged.

The invention provides a vanadium redox cell prepared by the process of any one of the ninth to twelfth aspects.

According to a thirteenth aspect there is provided a process for the production of electricity from a vanadium halide redox cell of the third or fourth aspects which process comprises withdrawing electrical energy from the redox cell.

Withdrawing electrical energy may comprise electrically coupling an electrical load with a positive electrode in the positive half cell and with a negative electrode in the negative half cell.

According to a fourteenth aspect of this invention there is provided a process of rebalancing the electrolytes of a vanadium halide redox cell of any one of the first to fourth aspects comprising mixing the positive half cell solution with the negative half cell solution to form a mixed solution and placing the mixed solution in the positive half cell and the negative half cell.

The positive half cell may be sealed air tight and the positive solution may be deaerated. The positive half cell may be deaerated. The positive half cell and the positive solution may be deaerated with nitrogen, argon, helium, or other suitable gas. The positive half cell and the positive solution may be deaerated with a non oxygen containing gas. The negative half cell may be sealed air tight and the negative solution may be deaerated. The negative half cell may be deaerated. The negative half cell and the negative solution may be deaerated with nitrogen, argon, helium, or other suitable gas. The negative half cell and the negative solution may be deaerated with a non oxygen containing gas.

According to a fifteenth aspect of this invention there is provided a vanadium halide redox cell system comprising a vanadium halide redox cell of any one of the first to fourth aspects of the invention and further comprising a positive solution reservoir, positive solution supply and return lines coupled between the positive solution reservoir and the positive half cell, a negative solution reservoir, negative solution supply and return lines coupled between the negative solution reservoir and the negative half cell, and at least one pump in at least one of the positive solution supply and return lines and at least one pump in at least one of the negative solution supply and return lines.

The system of the fifteenth aspect may further comprise an electrical charger electrically coupled to a positive electrode in the positive half cell and to a negative electrode in the negative half cell. The electrical charger may comprise a power supply and a switch. The system of the fifteenth aspect may further comprise an electricity withdrawing circuit electrically coupled to a positive electrode in the positive half cell and to a negative electrode in the negative half cell. The electricity withdrawing circuit may comprise a resistor and a switch.

The positive and negative electrodes may be graphite, carbon, glassy carbon, carbon fibre material (e.g. non-woven, type CFT-3000 Ahlstroem, Finland) cellulose carbon knit (e.g. GF-20, Nikon Carbon Company Limited, Japan), platinised titanium, Pt, AU, Pb, $RuO_2$, dimensionally stabilized anodes (for the positive electrode) such as noble metal doped $TiO_2$, $RuO_2$ or $IrO_2$ or combinations thereof, conductive polymer coatings or other suitable electrodes.

DESCRIPTION OF THE INVENTION

Throughout the specification and claims the term polyhalide complex or ion is a complex or ion of three of more halogen atoms. Examples of polyhalide complexes are $Br_3^-$, $ClBr_2^-$ and $BrCl_2^-$ (see also PCT/AU02/01157 incorporated herein by cross reference for further examples).

The terms electrolyte and supporting electrolyte are used interchangeably throughout the specification. The electrolytes used in the redox cells of the invention are preferably an aqueous electrolytes.

In the improved vanadium halide redox flow cell, a 50:50 mixture of V(IV) and V(III) halide solution (referred to as V(3.5+) is used as the initial feed solution in both the positive and negative half-cells. In contrast to a Vanadium Bromide Redox Flow Battery employing a V(IV) bromide feed solution therefore, during the initial charge of the improved cell, the V(III) and V(IV) ions are reduced to $V^{2+}$ in the negative half-cell according to the reaction:

Negative Electrode Initial Charge Reaction:

$$V^{3+}+VO^{2+}+2H^++3e \rightarrow 2V^{2+}+H_2O$$

while in the positive half-cell, the initial charge reactions are:
Positive Electrode Initial Charge Reactions:

$$V^{3+}+VO^{2+}+H_2O \rightarrow 2VO^{2+}+2H^++e$$

followed by:

$$3Br^- \rightarrow Br_3^- + 2e$$

or in the presence of a bromide/chloride mixed supporting electrolyte:

$$2Br^- + Cl^- \rightarrow BrCl_2^- + 2e$$

$$or\ 2Br^- + Cl^- \rightarrow ClBr_2^- + 2e$$

Subsequent charge-discharge cycling thus involves:
At the negative electrode:

$$2V^{2+} \underset{\text{charge}}{\overset{\text{discharge}}{\rightleftarrows}} 2V^{3+} + 2e$$

And at the positive electrode:

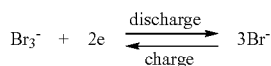

or in the presence of a bromide/chloride mixed supporting electrolyte:

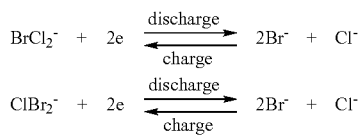

The vanadium halide redox flow cell and the vanadium halide redox cell thus employs a solution of 0.1 to 5 M vanadium (III)/(IV) halide (e.g. vanadium (III)/(IV) bromide or vanadium (III)/(IV) bromide/chloride) in both half-cells. The concentration of vanadium (III)/(IV) halide in both half-cells may be in the range 0.1 to 4.5M, 0.1 to 4M, 0.1 to 3.5M, 0.1 to 3M, 0.1 to 2.5M, 0.1 to 2M, 0.1 to 1.9M, 0.1 to 1.75M, 0.1 to 1.5M, 0.1 to 1.25M, 01 to 1M, 0.5 to 5M, 1 to 5M, 1.5 to 5M, 1.75 to 5M, 1.9 to 5M, 2 to 5M, 2.25 to 5M, 2.5 to 5M, 2.75 to 5M, 3 to 5M, 3.5 to 5M, 4 to 5M, 4.5 to 5M, 1.75 to 4.5M, 1.75 to 4M, 1.75 to 3.5M, 1.75 to 3.25M, 1 to 3M, 1.5 to 3M, 1.75 to 3M, 1 to 2.75M, 1.5 to 2.75 M 1.75 to 2.75, 1.5 to 2.5M, 1.75 to 2.5M, 1.75 to 2.25M, 1.75 to 2M, 1.9 to 3M, 1.9 to 2.75, 1.9 to 2.5M, 1.9 to 2.25M or 2 to 3M. The concentration of vanadium (III)/(IV) halide in both half-cells may be about 0.1, 0.25, 0.5, 0.75, 1, 1.25, 1.5, 1.75, 1.8, 1.9, 2, 2.1, 2.2, 2.3, 2.4, 2.5, 2.6, 2.7, 2.8, 2.9, 3, 3.25, 3.5, 3.75, 4, 4.25, 4.5, 4.75 or 5 M, for example. A solution of 0.1 to 5 M vanadium bromide or vanadium bromide/chloride solution consisting of approximately 50% V(III) and 50% V(IV) ions in a supporting electrolyte of HBr may be initially placed into the positive and negative half-cells. The electrolyte solution that is initially placed in both half-cells of the vanadium halide redox cell may comprise 0.5 to 5 M V(III)/(IV) bromide or V(III)/(IV) bromide/chloride in a supporting electrolyte of 0.5 to 10 M HBr, or 0.5 to 5 M HBr, for example. The electrolyte solution can also contain chloride ions at a concentration of 0.1 to 5 M, or 0.5 to 2 M in 0.5 to 10 M HBr, LiBr, NaBr, KBr or mixtures thereof. The concentration of chloride ions may be less than or equal to the electrolyte concentration of bromide ions (i.e. if the electrolyte is aqueous HBr at a concentration of 5M then the concentration of Cl$^-$ ions may be 5M (e.g. in the range of 0.05M to 5M such as in the range of 0.1 to 2M, or 0.2 to 2M or 0.5 to 2M or 0.75 to 2M, or 1 to 2 M or 1.5 to 2 M, or 1.75 to 2 M or 0.15 to 2.5 M or 0.15 to 3 M or 0.15 to 3.5 M for example). The reason for this is that in the presence of excess halide, bromine that forms during charging or discharging of the cell forms a bromide complex such as $ClBr_2^-$ or $Br_3^-$ in the electrolyte rather than significantly evolve as bromine gas whereas chlorine (which is formed when the concentration of chloride ions is higher than the concentration of bromide ions in the electrolyte) tends to not form a complex in the electrolyte but rather evolves as a gas which is not a convenient form (unlike a bromide complex in solution) to contain or recycle (by reducing the chlorine to chloride ions). When chloride ions are present mixtures of vanadium (III) and (IV) chloride, bromide and chloride/bromide will be present in the electrolyte.

In a separate embodiment, the initial feed solution for the positive half-cell is 0.5 to 5 M V(IV) halide (e.g. vanadium (IV) bromide or vanadium (IV) chloride/bromide) in a supporting electrolyte of 0.5 to 5 M HBr, while the initial feed solution for the negative half-cell comprises 0.5 to 5 M V(III) halide (e.g. vanadium (III) bromide or vanadium (III) chloride/bromide) in 0.5 to 5 M HBr. The electrolyte solution can also contain chloride ions at a concentration of 0.05 to 5.5 M, 0.1 to 5 M, or 0.5 to 2 M in 0.5 to 10 M HBr, LiBr, NaBr, KBr or mixtures thereof. The total bromide ion concentration may be greater than the total chloride ion concentration.

In the case of the high energy density vanadium halide redox cell, a solution of 0.1 to 5 M vanadium halide (e.g. vanadium bromide or vanadium bromide/chloride) consisting of approximately 2:1 V(III) to V(IV) ratio (referred to as V(3.33+)) is initially placed into both half cells, with the volume of the positive half-cell solution being approximately half the volume in the negative half-cell.

In its fully discharged or prior to charge state, the vanadium halide cell comprises a negative half-cell with a solution of V(III) and/or V(IV) ions in a supporting electrolyte selected from the group comprising HBr, NaBr, KBr or mixtures thereof and a positive half-cell with a solution of V(III) and/or V(IV) ions in a supporting electrolyte selected from the group comprising HBr, LiBr, NaBr, KBr or mixtures thereof. The discharged positive and negative half-cell electrolytes can also contain chloride ions at a concentration in the range of 0.05 to 5.5 M, 0.1 to 5 M, or 0.5 to 2 M. The total bromide ion concentration may be greater than the total chloride ion concentration.

In another embodiment of this invention, the high energy density vanadium halide redox flow cell, a 2:1 mixture of V(III) and V(IV) bromide or bromide/chloride solution is used as initial feed solution in both the positive and negative half-cells, the volume of the positive half-cell solution being half that of the negative half-cell solution. In contrast to a Vanadium Bromide Redox Flow Battery employing equal volumes of a V(IV) bromide or 50:50 V(III)/V(IV) feed solution on both sides therefore, during the initial charge of the cell containing equal volumes of the 2:1 V(III)/V(IV) mixture (referred to as V(3.33+), the following reactions would occur:
Negative Electrode Initial Charge Reaction:

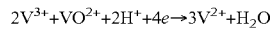

while in the positive half-cell, the initial charge reactions are:
Positive Electrode Initial Charge Reactions:

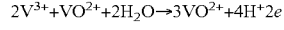

followed by:

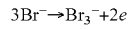

or in the presence of a bromide/chloride mixed supporting electrolyte:

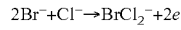

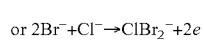

Subsequent charge-discharge cycling of this cell would thus involve:
At the negative electrode:

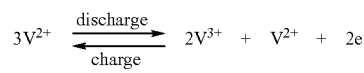

And at the positive electrode:

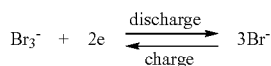

$$Br_3^- + 2e \underset{\text{charge}}{\overset{\text{discharge}}{\rightleftarrows}} 3Br^-$$

This shows that a third of the vanadium ions in the negative half-cell would remain unreacted. When using only half the volume of the V(3.33+) solution on the positive side however, all of the vanadium ions in the negative half-cell electrolyte would be reacted during charge-discharge cycling, so that more of the bromide ions could be utilised in the positive half-cell.

The high energy density vanadium halide redox flow cell or redox cell may thus employ an initial feed solution of 0.1 to 5 M vanadium (III)/(IV) halide in both half-cells, this solution may consist of an approximately 2:1 mole ratio of V(III) to V(IV) ions in a supporting electrolyte of HBr, the volume used in the positive half-cell being twice that used in the negative half-cell. The electrolyte solution that is initially placed in both half-cells of the vanadium halide redox cell may comprise 0.5 to 3 M V(III)/(IV) bromide or V(III)/V(IV) bromide/chloride in a supporting electrolyte of 0.5 to 10 M HBr, or 0.5 to 5 M HBr, for example. The electrolyte solution can also contain chloride ions at a concentration of 0.1 to 5 M, or 0.5 to 2 M, for example, in 0.5 to 10 M HBr, LiBr, NaBr, KBr or mixtures thereof. The total bromide ion concentration may be greater than the total chloride ion concentration.

The supporting electrolyte in each redox flow cell or redox cell may be HBr, NaBr, KBr or mixtures thereof in a concentration range from 0.1 to 12 M or from 2 to 10 M. HCl, LiCl, NaCl and/or KCl can also be added to the electrolyte to form stable polyhalides with the bromine that is formed in the positive half-cell during charging. The concentration of bromides ions should be greater than the concentration of chloride ions. The concentration of the vanadium bromides (or vanadium bromide/chloride where vanadium chloride/halide refers to a mixture of vanadium chloride, vanadium bromide and vanadium chloride bromide which will be present when chloride and bromide ions are present) in the negative and positive half-cell electrolytes of the vanadium halide redox flow cell or redox cell may be 0.1 to 6 M but more typically from 0.5 to 5 M or 1 to 5 M and even more typically 1 to 4 M. The concentration of the $Br_3^-$, $Br_2Cl^-$ and/or $Cl_2Br^-$ ions in the positive half cell of the fully charged vanadium halide redox flow cell or redox cell may be 0.1 to 5 M or 0.5 to 5 M or 1 to 3 M or 1 to 2M.

During cycling of the cells, the negative half-cell electrolyte comprises V(II), V(III) and/or V(IV) ions and the positive electrolyte comprises a halide/polyhalide couple (e.g. a bromide/polyhalide couple) in the presence of V(IV) and/or V(V) ions. During cycling, the negative half-cell electrolyte may contain $VBr_2$ and/or $VBr_3$ in a supporting electrolyte selected from the group HBr, LiBr, NaBr, KBr or mixtures thereof. The electrolyte may also include HCl, NaCl, KCl or mixtures thereof. The negative half cell electrolyte solution may comprise 0.5 to 5 M $VBr_3$ and/or $VBr_2$ in 0.1 to 10 M HBr or HCl/HBr or LiCl/HBr, NaCl/HBr or KCl/HBr mixtures. The concentration of bromides ions should be greater than the concentration of chloride ions.

The charged or partially charged positive half-cell of the vanadium halide redox flow cell or redox cell contains an electrolyte solution of vanadium ions and one or more of the redox couples selected from the group $Br^-/Br_3^-$, $Br^-/Br_2Cl^-$ or mixtures thereof. In the discharged state, the vanadium halide redox flow cell or redox cell contains a positive half-cell electrolyte solution that includes vanadium ions in a mixture of $Cl^-$ and $Br^-$ of total concentration 1 to 12 M. The concentration of bromide ions should be greater than the concentration of chloride ions. In the charged or partially charged state, the positive half-cell electrolyte includes vanadium ions in a solution containing 0.5 to 5 M $Br_3^-$ or $Br_2Cl^-$ ions or mixtures thereof.

A partially charged negative half-cell electrolyte solution for the vanadium halide redox flow cell or redox cell may comprises 0.5 to 5 M $VBr_2$ and/or $VBr_3$ in a supporting electrolyte of HBr, LiBr, NaBr, KBr or mixtures thereof. The negative half-cell electrolyte solution can also contain $Cl^-$ ions at a concentration of 0.1 to 5 M. The excess bromide and chloride ion concentration in the negative half-cell electrolyte may be 0.1 to 10 M or 0.1 to 5 M. The concentration of bromide ions should be greater than the concentration of chloride ions.

The partially charged positive half-cell electrolyte solution for the vanadium halide redox flow cell or redox cell may comprise polyhalide completes plus V(IV) and/or V(V) ions in a supporting electrolyte of HBr, LiBr, NaBr, KBr or mixture thereof. The positive half-cell electrolyte solution may contain 0.5 to 5 M vanadium ions in a mixture of 0.5 to 12 M bromide and chloride ions. The concentration of bromide ions may be greater than the concentration of chloride ions.

The feed electrolyte solution for use in both half-cells of the high energy density vanadium halide redox cell may comprise 0.5 to 5 M vanadium bromide or vanadium bromide/chloride with a 2:1 molar ratio of V(III) and V(IV) ions in a supporting electrolyte of HBr, LiBr, NaBr, KBr or mixtures thereof, the volume of the positive half-cell being approximately half the negative half-cell volume. The V(III) to V(IV) ion ratio in the feed solution can vary from 1.8:1 to 2.2:1 and the volume ratio of the negative and positive electrolytes can also vary between 1.8:1 and 2.2:1. The electrolyte solution may also contain chloride ions at a concentration of 0.1 to 5 M. The concentration of bromide ions may be greater than the concentration of chloride ions. The electrolyte solutions may have an excess bromide and chloride ion concentration between 0.1 to 10 M or more typically 0.1 to 5 M.

The supporting electrolyte may be HBr, LiBr, NaBr, KBr or mixtures thereof in a concentration range from 0.1 to 12 M or from 2 to 10 M. It is also possible to add HCl, LiCl, NaCl or KCl to the supporting electrolyte to form stable polyhalides with the bromine that is formed in the positive half-cell during charging. The concentration of bromide ions may be greater than the concentration of chloride ions. The concentration of the vanadium bromides in the negative and positive half-cell electrolytes of the high energy density vanadium halide redox flow cell or redox cell may be 0.1 to 4 M, 0.5 to 4 M, 1 to 3.5 M or 1 to 3 M, for example. The concentration of the $Br_3^-$, $Br_2Cl^-$, and/or $Cl_2Br^-$ ions in the positive half cell of the fully charged vanadium halide redox flow cell or redox cell may be 0.1 to 5M, 0.5 to 4 M, 1 to 3.5 M or 1 to 3 M, for example.

The electrolyte can also contain a suitable complexing agent to stabilise the bromine or polyhalide produced during charging of the vanadium halide redox flow cell or redox cell. Complexing the bromine with suitable complexing agents such as polyethylene glycol, tetra-alkyl-ammonium halides such as 2-pyrrolidone, n-methylpyrrolidone, or ring structures with nitrogen atoms in the ring structure, such as pyridine compounds, will stabilise the bromine so that more of the bromide ions in solution can be oxidised during charging.

In a separate embodiment of this invention, a gelled or immobilised vanadium halide redox cell is also disclosed. By immobilising or gelling the vanadium halide cell electrolytes with an immobilising or gelling agent such as silica, fumed silica, fumed alumina, fumed titania or polyacrylamide, it is also possible to stabilise the bromine produced, so that a greater fraction of the bromide ions can be oxidised during charging in the positive half-cell electrolyte.

The two half-cell electrolytes or the flow-cell are separated by an ion exchange membrane which prevents the bulk mixing of the 2 solutions as they are pumped through the cell or cell stack. The ion exchange membrane can be a cation exchange membrane which would allow the transfer of the charge carrying $H^+$, Li+, $Na^+$ and/or $K^+$ ions depending on the composition of the supporting electrolyte. If an anion exchange membrane is used, then charge transfer could be via either the $H^+$ $Br^-$ and/or $Cl^-$ ions. The ion exchange membrane may be a cation exchange membrane such as Gore Select P-03430 or other Gore Select membrane, a Flemion membrane or a Selemion CMV membrane, for example. Other suitable cation or anion exchange membranes may also be used, the requirement being good chemical stability in the vanadium bromide/bromine or vanadium halide/bromine solution, low electrical resistivity and low permeability for the vanadium and polybromide or polyhalide ions in the positive half-cell and the vanadium ions in the negative half-cell electrolytes. Polybromide ions refers to a complex having three or more bromine atoms.

The negative and positive electrode materials for the vanadium halide redox flow cell or redox cell may be porous carbon or graphite felt, matte or cloth materials on a graphite, glassy carbon or conducting plastic substrate. The positive electrode material can also be an oxide coated titanium metal sheet or expanded metal mesh. The titanium based electrode would provide greater long term stability against oxidation during charging of the positive half-cell solution. Multiple cells can also be incorporated into a cell stack consisting of bipolar electrodes, these bipolar electrodes comprising carbon or graphite felt, cloth or matte either pressed against or heat welded onto a conducting plastic substrate, this conducting plastic substrate comprising carbon filled polyethylene, polypropylene or other thermoplastic polymer that may also be mixed with a rubber material to impart good mechanical properties. The bipolar electrodes for the vanadium halide redox flow cell or redox cell can also be produced by heat bonding the porous carbon or graphite felt into each side of a polyethylene, polypropylene or other polymer sheet such that the conducting carbon or graphite felt fibres in each side of the insulating substrate contact each other through the plastic sheet, thereby making electrical contact without the need to add a conducting filler to the plastic substrate.

The two half-cell electrolytes are stored in external tanks and are pumped through the cell stack where the charging and discharging reactions occur. The electrolytes can be electrically charged by connecting the cell or battery terminals to a suitable power source, but can also be mechanically refueled by exchanging the discharged solutions with recharged solutions at a refueling station in the case of electric vehicle applications.

To discharge the battery, the stack terminals are connected to a load and when the circuit is closed, electricity is produced by the flow of electrons from the negative terminal to the positive terminal of the cell or battery stack. Charging and discharging can be carried out either with the pumps switched on and the electrolytes recirculating through the external tanks and cell stack, or with the pumps off, allowing the solution in the stack itself to undergo discharge reactions. Periodically the two solutions may be remixed to produce the original V(3.5+) or in the case of the high energy density cell, the original V(3.33+) electrolytes in both tanks. This periodic mixing allows any chemistry imbalance arising from the transfer of ions across the membrane to be corrected, so that the capacity of the system can be restored. The periodic mixing can be full or only partial mixing.

In a separate embodiment, the negative half-cell feed solution comprises V(III) bromide or V(III) bromide/chloride in a bromide or bromide/chloride supporting electrolyte, while the positive half-cell feed solution comprises V(IV) bromide or V(III) bromide/chloride in a bromide or bromide/chloride supporting electrolyte. When re-mixing these solutions to restore the system capacity, the same V(3.5+) or V(3.33+) electrolyte as in the previous embodiments is produced.

In a separate embodiment of this invention, a method is described for the production of the V(3.5+) or V(3.33+) halide electrolytes. The method for producing the V(3.5+) halide electrolyte may involve the mixing of a 3:1 molar ratio of a V(III) compound with a V(V) compound in a solution of HBr, LiBr, NaBr, KBr or mixtures thereof and stirring until fully dissolved to produce an approximately 1:1 mixture of V(III) and V(IV) ions. The V(III) compound may be $V_2O_3$, for example, and the V(V) compound may be $V_2O_5$, for example, and the vanadium trioxide to vanadium pentoxide powder ratio can range from 2.8:1 to 3.2:1. The solution may also contain chloride ions. The concentration of bromide ions may be greater than the concentration of chloride ions.

The method for producing the V(3.3+) electrolyte for the high energy density vanadium bromide redox cell may involve the mixing of a V(III) compound with a V(V) compound in an approximately 4.5:1 molar ratio in a solution of HBr, LiBr, NaBr, KBr or mixtures thereof and stirring until fully dissolved to produce an approximately 2:1 mixture of V(III) and V(IV) ions. The V(III) compound may be $V_2O_3$ and the V(V) compound may be $V_2O_5$ and the vanadium trioxide to vanadium pentoxide powder ratio can range from 4:1 to 4.9:1. The solution may also contain chloride ions. The concentration of bromide ions may be greater than the concentration of chloride ions.

The method for producing the electrolyte for the vanadium halide redox cell can also involve the mixing of 2:1 molar ratio of a V(III) compound and a V(IV) compound in a solution of HBr, LiBr, NaBr, KBr or mixtures thereof and stirring until fully dissolved to produce an approximately 2:1 mixture of V(III) and V(IV) ions. In this method, the V(III) compound is $V_2O_3$ and the V(IV) compound is $V_2O_4$ and the $V_2O_3$ to $V_2O_4$ molar ratio an range from 1.8:1 to 2.2:1. In each of the above methods, the total vanadium ion concentration may be between 0.5 and 5 M and the total bromide ion concentration may be between 2 and 12 M. The solution may also contain chloride ions. The concentration of bromide ions may be greater than the concentration of chloride ions.

The supporting electrolyte may be HBr and the total bromide ion concentration may be 8 to 12 M. The supporting electrolyte may also contain chloride ions at a concentration in the range of 0.5 to 3 M.

The powders may be mixed at elevated temperatures above 40° C. for periods of 30 minutes or more until all the powder is fully dissolved.

In a separate embodiment, the 2-4 M vanadium halide electrolyte may be gelled with 3-6 wt % fumed silica or other suitable gelling agent to produce a gelled or immobilised electrolyte VBr redox cell that permits greater stabilisation of the bromine produced during charging. In this embodiment, all of the solutions are stored in the cell stack and there are no external tanks or pumps.

MODE OF OPERATION

A 2-4 M vanadium bromide solution comprising approximately 50% V(III) and 50% V(IV) ions is produced by mixing and reacting a 3:1 molar ratio of vanadium trioxide and vanadium pentoxide powders at a temperature above 60° C. (or in a range such as 60.5-100° C., 62-99° C., 65-95° C., 70-90° C., 70-85° C., 70-80° C., or 60.5-85° C.) in a supporting electrolyte of 6-12 M $Br^-$ or $Br^-/Cl^-$ solution. The resultant V(III)/V(IV) electrolyte solution is added in equal volumes to both sides of the vanadium halide redox flow cell or battery. On initial charging of the cells, the vanadium (III)/(IV) bromide solution is reduced to produce 2-4 M $VBr_2$ in the negative half-cell, while in the positive half-cell, the V(III) ions are oxidised to V(IV) and/or V(V) and the bromide ions are oxidised to produce 1-2 M $Br_3^-$ or $ClBr_2^-$.

The high energy density vanadium halide redox flow cell involves the use of a 2-3 M V(III)/V(IV) solution consisting of an approximately 2:1 molar ratio of V(III) to V(IV) in each half-cell, whereby the volume in the negative half-cell is approximately twice that in the positive half-cell. During initial charging of the high energy density vanadium bromide redox cell or battery, the vanadium (III)/(IV) bromide solution is reduced to produce 2-3 M $VBr_2$ in the negative half-cell, while in the positive half-cell, the V(III) ions are oxidised to V(IV) and/or V(V) and the bromide ions are oxidised to produce 2-3 M $Br_3^-$ or $ClBr_2^-$.

On discharge of both cells, the $VBr_2$ is oxidised to $VBr_3$ in the negative half cell while the $Br_3^-$ or $ClBr_2^-$ ions are reduced to $Br^-$ ions in the positive half cell. The cells or battery stacks comprise carbon or graphite felt electrodes bonded onto plastic or conducting plastic sheets as substrate materials and the two half cells are separated by an anion or cation exchange membrane. Membranes include Gore Select P-03430 (cation exchange membrane from W. L. Gore) or other cation exchange membranes. The electrodes may also comprise carbon or graphite felt or matte compressed against a glassy carbon or graphite sheet substrate. The two half-cell electrolytes are stored in external tanks and are pumped through the cell stack where the charging and discharging reactions occur. The electrolytes can be electrically charged by connecting the cell or battery terminals to a suitable power source, but can also be mechanically refueled by exchanging the discharged solutions with recharged solutions at a refueling station.

Figure 12:
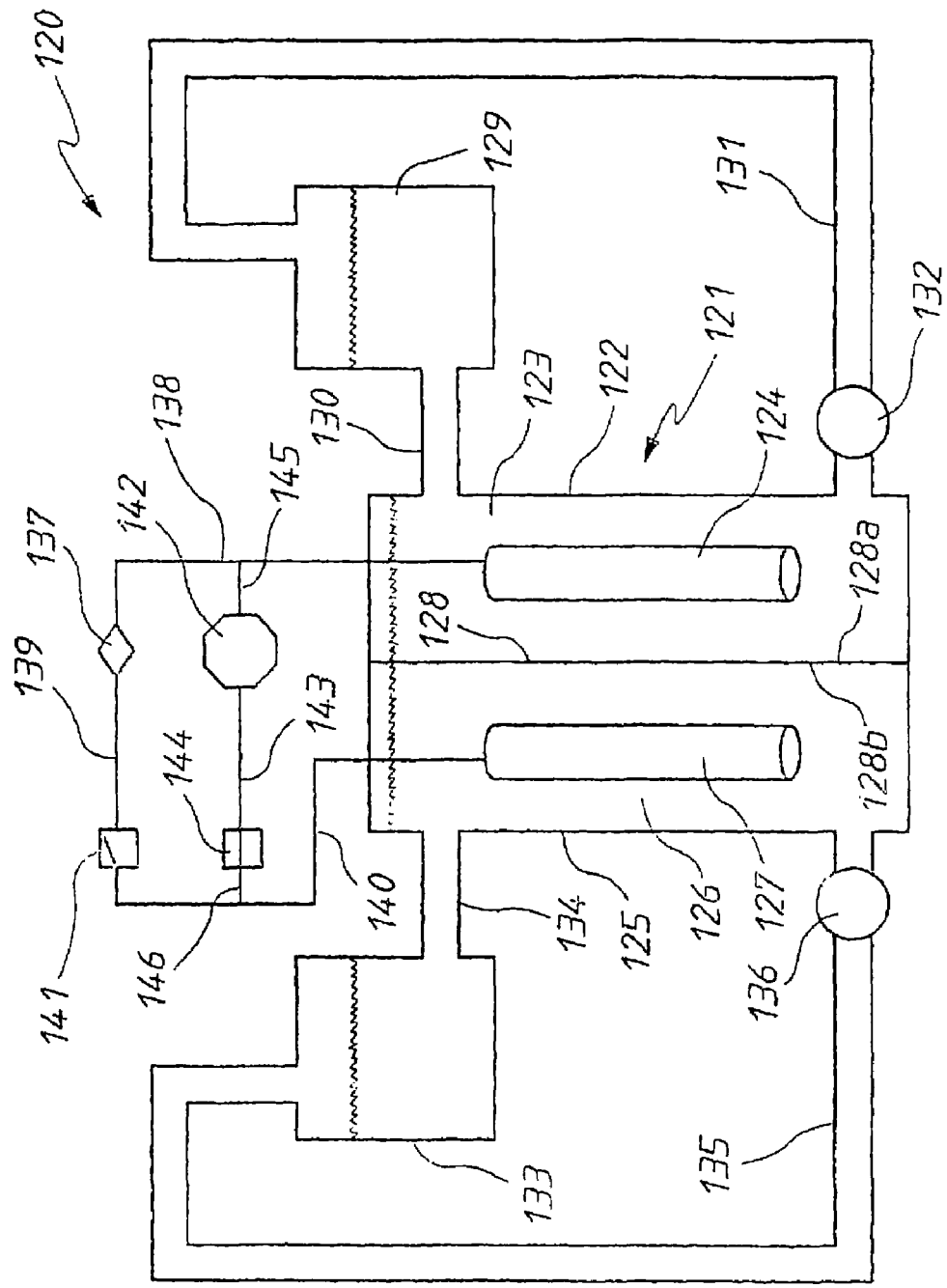
FIG. 12 depicts a vanadium halide redox system.

FIG. 12 depicts a vanadium halide redox cell system 120 which includes vanadium halide redox cell 121 which has positive half cell 122 containing positive half cell solution 123 and positive electrode 124, negative half cell 125 containing negative half cell solution 126 and negative electrode 127 and ionically conducting separator 128 which separates positive half cell 122 from negative half cell 125 and is in contact with positive solution 123 on side 128a adjacent positive half cell 122 and is in contact with negative solution 126 on side 128b adjacent negative half cell 125. Positive solution reservoir 129 is coupled to positive half cell 122 by positive solution supply line 130 and return line 131. Return line 131 has pump 132. Negative solution reservoir 133 comprises negative solution supply line 134 and return line 135 coupled between negative solution reservoir 133 and negative half cell 125. Return line 135 has pump 136. Power supply 137 is electrically coupled to positive electrode 124 in positive half cell 122 via line 138 and to negative electrode 127 in negative half cell 125 via line 139, switch 141 and line 140. Electricity withdrawing circuit 142 (which may be a resistor, for example) is electrically coupled to positive electrode 124 in positive half cell 122 via lines 145 and 138 and to negative electrode 127 in negative half cell 125 via line 143, switch 144, line 146 and line 140. Half cells 122 and 125 and reservoirs 129 and 133 are sealed air tight and the positive and negative electrolyte solutions 123 and 126 may be deaerated. The atmosphere above solutions 123 and 126 in half cells 122 and 125 and reservoirs 129 and 133 may be an inert gas such as nitrogen, helium or argon, or mixtures thereof, for example.

In one particular way of operating system 120 positive half cell solution 123 comprising halide electrolyte, vanadium (III) halide and vanadium (IV) halide is placed in positive half cell 122 and positive solution reservoir 129 and negative half cell solution 126 which has the same composition as the positive half cell 123, namely, comprising a halide electrolyte, vanadium (III) halide and vanadium (IV) halide is placed in negative half cell 125 and negative solution reservoir 133. The amounts of vanadium (III) halide, vanadium (IV) halide and halide ions in the positive and negative half cell solutions 123 and 126 are such that in a first charging step vanadium halide redox cell 121 may be prepared having a state of charge selected from the group consisting of a zero state of charge and a near zero state of charge comprising predominantly vanadium (IV) halide in a halide electrolyte in the positive half cell solution 123 and predominantly V(III) halide in a halide electrolyte the negative half cell solution 126. In the positive and negative solutions 123 and 126 the halide is selected from the group consisting of bromide and a combination of bromide and chloride and the concentration of bromide ions is greater than the concentration of chloride ions and the total halide ion concentration is at least 3 times the total vanadium ion concentration. The positive half cell solution 123 comprises vanadium (III) halide and vanadium (IV) halide in a V(III):V(IV) molar ratio of from about 0.9:1 to about 6:1 in the halide electrolyte and negative half cell solution 126 comprises vanadium (III) halide and vanadium (IV) halide in a V(III):V(IV) molar ratio of from about 0.9:1 to about 6:1 and the volume of the negative half cell solution 126:the volume of the positive half cell solution 123 is equal to or about equal to the V(III):V(IV) molar ratio. In one particular advantageous form the positive and negative half cell solutions 123 and 126 comprise vanadium (III) halide and vanadium (IV) halide in a V(III):V(IV) molar ratio of about 1:1 and wherein the volume of the negative half cell solution 126:the volume of the positive half cell solution 123 is about 1:1. In another particular advantageous form the positive and negative half cell solutions 123 and 126 comprise vanadium (III) halide and vanadium (IV) halide in a V(III):V(IV) molar ratio of about 2:1 and wherein the volume of the negative half cell solution 126:the volume of the positive half cell solution 123 is about 2:1.

The first charging step may be carried out by opening switch 144 and closing switch 141 and allowing sufficient electricity to flow between electrodes 124 and 127 whilst at the same time turning on pumps 132 and 136 so that positive half cell solution 123 is recirculated through positive half cell 123 and negative half cell solution 126 is recirculated through negative half cell 125 such that predominantly vanadium (IV) halide is formed in the positive half cell solution 123 without a polyhalide complex being formed and predominantly V(III) halide is formed in the negative half cell solution 126 where cell 121 is at a zero state of charge or near zero state of charge. The charging is allowed to continue in a second charging step so that redox cell 121 is fully or partially charged comprising a polyhalide complex and vanadium (V) ions in positive half cell solution 123 and vanadium (II) halide in negative half cell solution 126 wherein the number of moles of polyhalide complex and vanadium (V):number of moles of vanadium (II) halide is about stoichiometrically balanced (in the case where redox cell 121 is fully or partially charged). Once the second charging step is completed (or partially completed) redox cell 121 may be used to deliver electricity by opening switch 141, closing switch 144, turning on pumps 132 and 136 so that positive half cell solution 123 is recirculated through positive half cell 123 and negative half cell solution 126 is recirculated through negative half cell 125 and withdrawing electrical energy via electricity withdrawing circuit 142. Once redox cell 121 is fully or partially discharged to a zero state of charge or near zero state of charge, for example, cell 121 may be recharged by repeating the second charging step as described above. One advantage of the redox system of the invention is that very little halide gas is generated above the positive half cell solution 123 during the first and second charging processes.

In an alternative way of operating system 120 predominantly vanadium (IV) halide in a halide electrolyte may be initially placed in the positive half cell 122 and reservoir 129 and predominantly V(III) halide in a halide electrolyte may be placed in the negative half cell 125 and reservoir 133 in amounts and volumes such that cell 121 is at a zero state of charge or near zero state of charge. Cell 121 may then be charged in accordance with the second charging step described above and discharged as described above.

EXAMPLE 1

Figure 6:
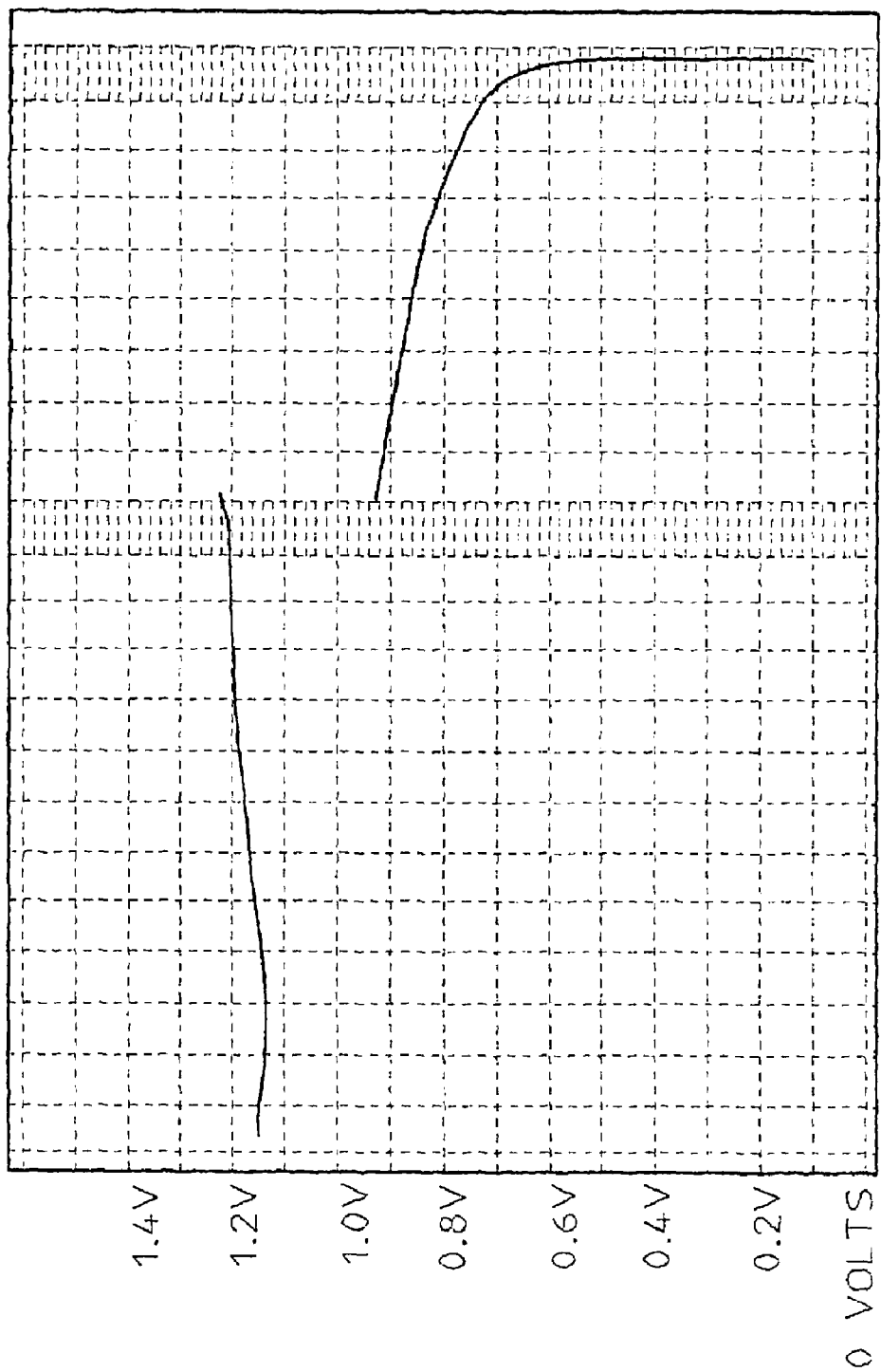
FIG. 6 shows the initial charge and discharge curve for a cell employing a 2 M V(3.5+) solution in 6 M $Br^-$+2 M $Cl^-$ supporting electrolyte as the feed electrolyte for both positive and negative half-cells. Charging and discharge current=1 Amp, electrode area=25 $cm^2$. Initial charge time=3.2 hours, initial discharge time=2.2 hours.

FIG. 6 shows the initial charge-discharge curve for a vanadium halide redox flow cell containing 60 ml in each half-cell of a 2 M V(3.5+) solution in 6 M Br$^-$ plus 2 M Cl$^-$. The cell employed a Gore Select P-03430 membrane. The cell was initially charged to a voltage of 1.25 V and discharged to a lower voltage limit of 0.25 V at a constant current of 1.0 Amp. The ratio of the initial charge time to the discharge time is seen to be approximately 1.5 showing that during the initial charge, 1.5 electrons per mole of vanadium are used in converting the V(3.5+) solution to V$^{2+}$ in the negative half-cell while in the positive half-cell, V(III) ions are first oxidised to V(IV) followed by the oxidation of Br$^-$ ions to Br$_3^-$. Subsequent charge-discharge cycles gave average charge and discharge time ratios of between 1.05 and 1.1, corresponding to coulombic efficiencies of 95 to 91%.

EXAMPLE 2

A cell employing a solution of 3 M vanadium (III)/(IV) bromide as the active material in both half-cells was set up and evaluated as follows:

The 50:50 vanadium(III)/vanadium (IV) bromide mixture (referred to as 3 M V(3.5+)) was prepared by dissolving the required amounts of vanadium trioxide and pentoxide powders in 8 M hydrobromic acid. Hydrochloric acid was also added to bring the final solution chloride concentration to 1.5 M.

Figure 7:
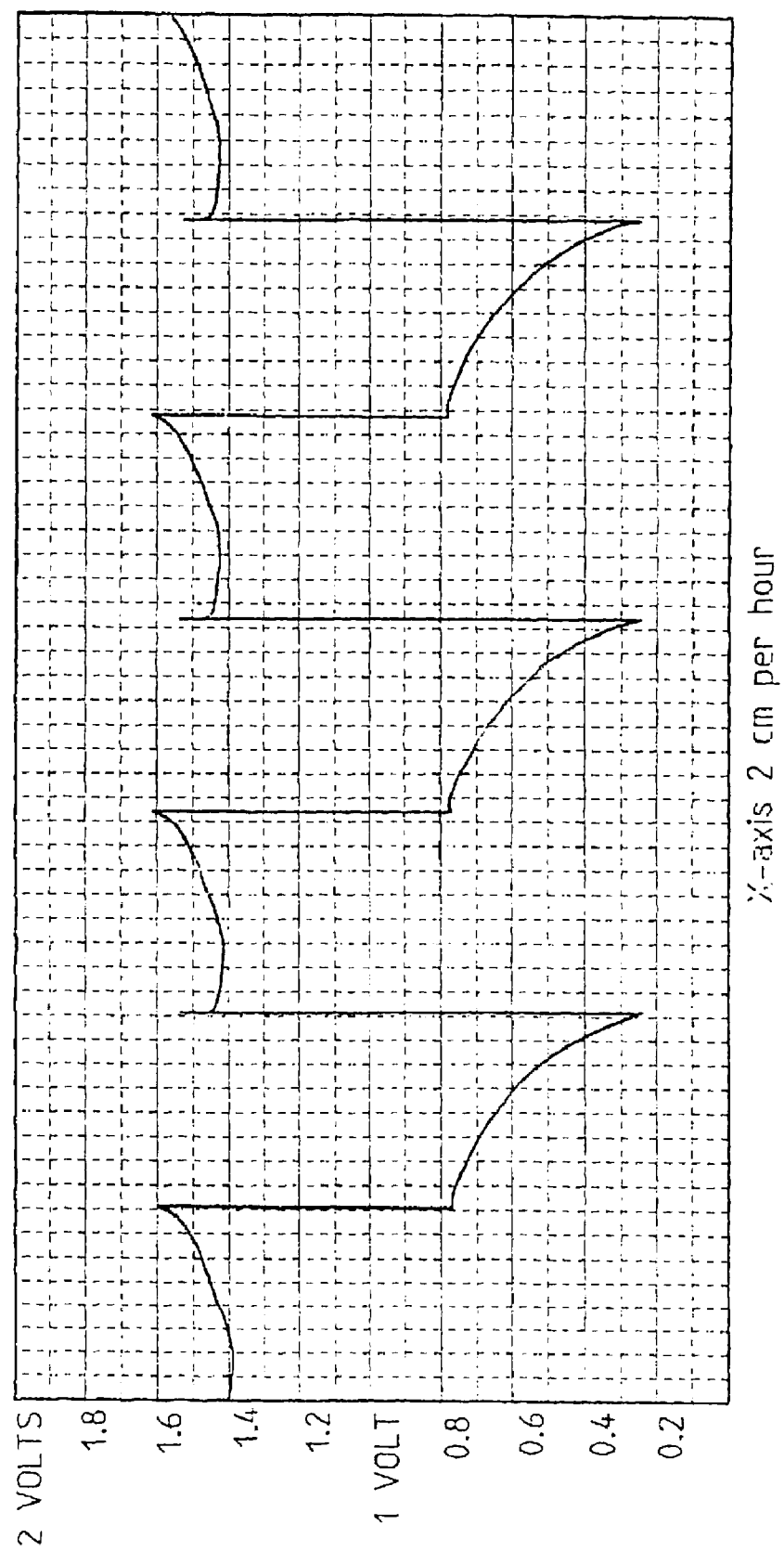
FIG. 7 represents the cell voltage versus time plot for charge-discharge cycling of a vanadium halide redox flow cell containing 60 ml in each half-cell of 3 M vanadium solution in 8 M $Br^-$ plus 1.3 M $Cl^-$. Electrode area=25 $cm^2$, charging and discharging current=2 Amps.

FIG. 7 shows the cell voltage versus time curves obtained during the charging and discharging cycling of the cell containing 60.0 mls of the solution in each half-cell and employing a Gore Select P-03430 membrane. The cell was charged to a voltage of 1.6 V and discharged to a lower voltage limit of 0.25 V at a constant current of 2.0 Amp. The theoretical charge and discharge time, assuming complete reaction of the vanadium ions in the negative half-cell was calculated as 2.4 hours. This compares with measured charge and discharge times of 2.1 and 2 hours respectively over the applied voltage limits, as seen in FIG. 7. The coulombic efficiency was therefore calculated as over 95%. The cell was cycled for more than 30 cycles and a negligible drop in capacity was observed, showing that the V(III)/V(IV) feed solution provides a stable electrolyte for the vanadium halide redox flow cell.

EXAMPLE 3

A 3 M V(3.5+) solution was prepared by combining a 3:1 mole ratio of $V_2O_3$:$V_2O_5$ powders as follows:
Mass $V_2O_3$ used: 168.64 g
Mass $V_2O_5$ used: 62.21 g
1000 ml of 8M HBr was mixed with 150 ml 10 M HCl, stirred and heated around to 80° C. The $V_2O_3$ powder was slowly added to the HBr/HCl mixture, followed by slow addition of the $V_2O_5$ powder. The solution was then boiled to around 150° C. for about 1 hour. The final volume was approximately 1010 ml. During the vanadium oxide dissolution, negligible bromine was detected. When the same process was repeated by simultaneously adding the vanadium trioxide and vanadium pentoxide powders to the HBr/HCl mixture, however, bromine gas was observed to form as the vanadium pentoxide oxidised the bromide ions to bromine.

EXAMPLE 4

A 4 M vanadium bromide solution for use in the redox flow cell was prepared by the following method:
1. 0.5 moles of $V_2O_5$ and 1.5 moles of $V_2O_3$ powders were weighed into two separate containers.
2. The $V_2O_5$ powder was added to 0.8 liters of a 9-10 M HBr solution in a beaker and the $V_2O_3$ powder slowly added with continuous stirring. The mixture was stirred for a few hours until a blue V(III)/(IV) bromide solution was obtained.
3. The solution was filtered and 10 M HCl was added to bring the final chloride concentration to 2M before bringing the volume to 1 liter with the HBr solution.

EXAMPLE 5

A 4 M V(3.5+) solution was prepared by reacting a 3:1 mole ratio of $V_2O_3$:$V_2O_5$ powders as follows:
Mass $V_2O_3$ used: 169.00 g
Mass $V_2O_5$ used: 68.50 g
1000 ml 8M HBr was mixed with 150 ml 10 M HCl, stirred and heated to around 80° C. The $V_2O_3$ powder was added slowly over 25 minutes followed by addition of the $V_2O_5$ over 15 minutes to dissolve the powder. The solution was then boiled for about 2 hours to a final volume of 750 ml. No bromine was detected during the dissolution and boiling.

EXAMPLE 6

Figure 8:
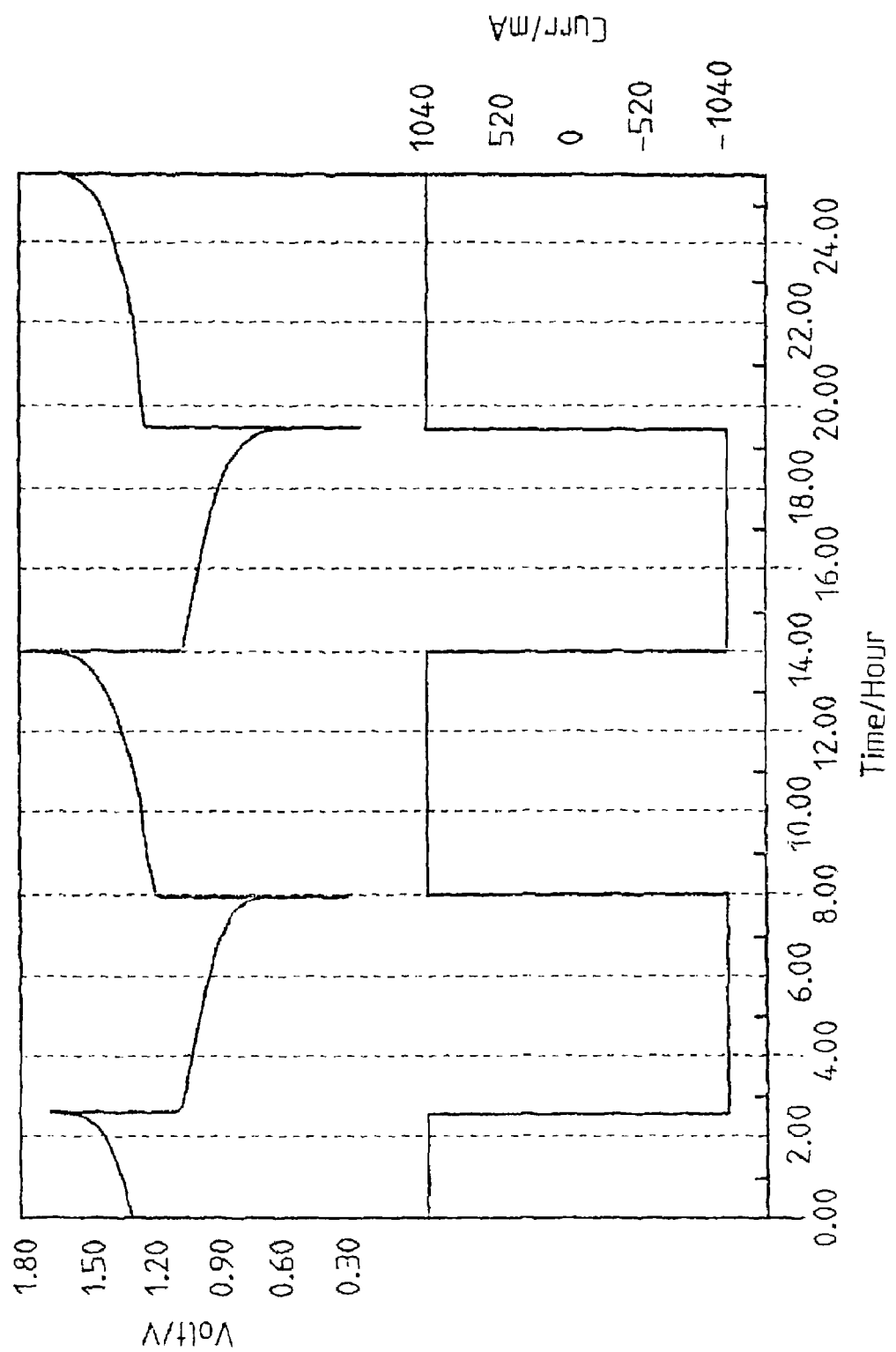
FIG. 8 shows typical charge and discharge curves for a cell employing 110 mls of 2 M V(3.5+) in 8 M $Br^-$ supporting electrolyte as feed solution in both half-cells. Charging and discharge current=1 Amp, electrode area=25 $cm^2$.

A 2 M V(3.5+) solution was prepared by mixing a 3:1 mole ratio of $V_2O_3$:$V_2O_5$ powders as follows:
Mass $V_2O_3$ used: 112.50 g
Mass $V_2O_5$ used: 45.55 g
800 ml of 8M HBr and 200 ml 10 M HCl were stirred together at 60° C. with refluxing, The $V_2O_3$ powder was added slowly over 35 minutes followed by $V_2O_5$. Approximately 20 minutes was needed to add and dissolve the powder. Negligible bromine gas was detected. Five minutes after all the powder dissolved, the heating and stirring was stopped. The cooled solution was then put into a 1000 ml flask, and 63 ml of distilled water was needed to made the solution up to the 1000 ml mark.
FIG. 8 shows typical charge-discharge curves for a vanadium halide redox flow cell containing 110 ml in each half-cell of a 2 M V(3.5+) solution in 8 M Br$^-$. The cell employed a Gore Select L-01854 membrane. The cell was initially charged to a voltage of 1.6 V and discharged to a lower voltage limit of 0.25 V at a constant current of 1.0 Amp. Although it is not shown in the graph, the initial charge time was approximately 9 hours. This is due to the fact that during the initial charge, 1.5 electrons per mole of vanadium are used in converting the V(3.5+) solution to $V^{2+}$ in the negative half-cell while in the positive half-cell, V(III) ions are first oxidised to V(IV) followed by the oxidation of Br$^-$ ions to Br$_3^-$. The second charge-discharge cycle gave a charge and discharge time of 6 and 5.5 hours respectively, corresponding to a coulombic efficiency of approximately 92%. The theoretical capacity of the cell employing 110 mls of 2 M vanadium solutions is approximately 5.9 hours, so that the active material utilisation is over 93% at a current density of 40 mA/cm$^2$.

EXAMPLE 7

Figure 1:
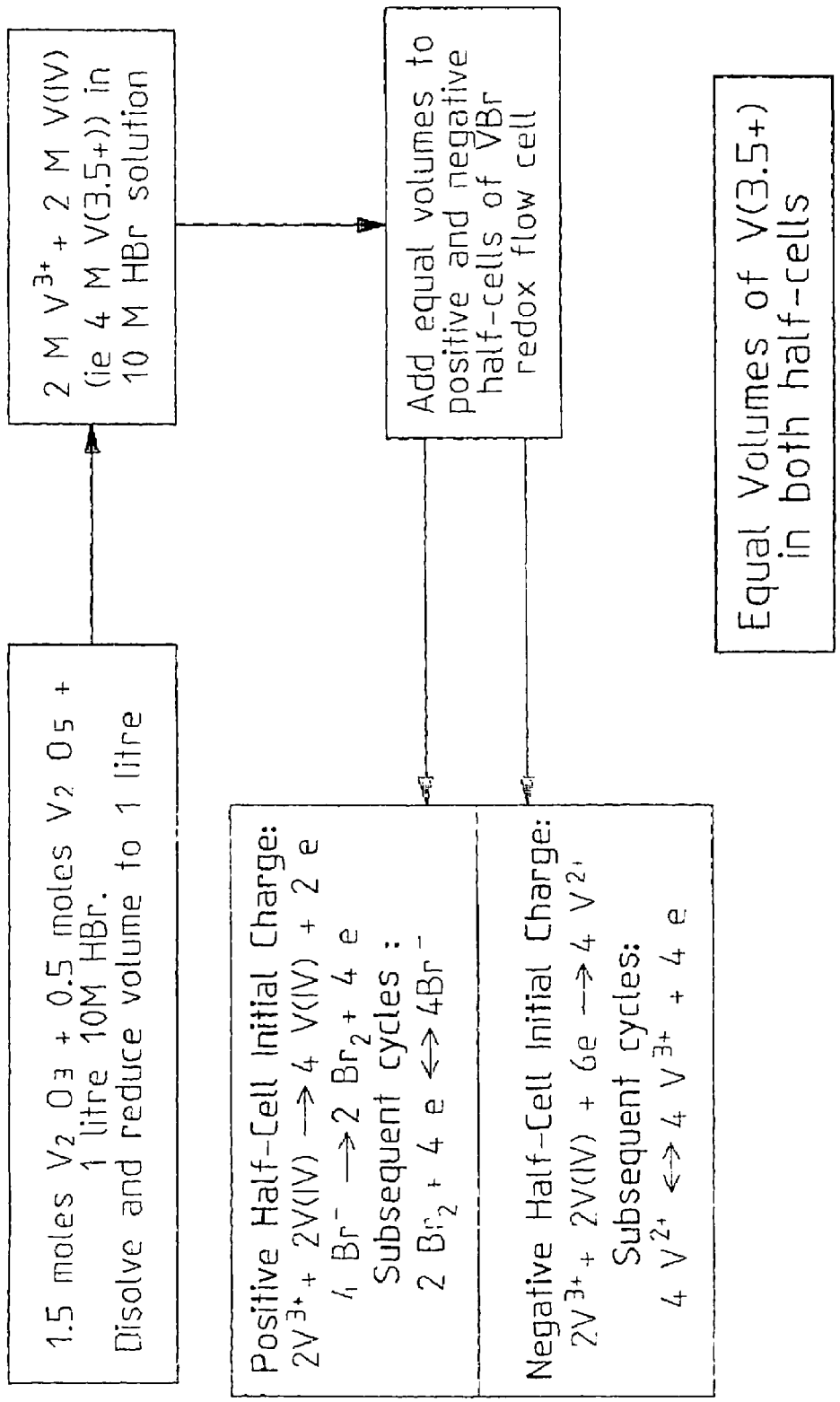
FIG. 1 illustrates the preparation and use of a V(3.5+) bromide electrolyte as feed solution for both the positive and negative half-cells of the vanadium halide redox flow cell.
Figure 2:
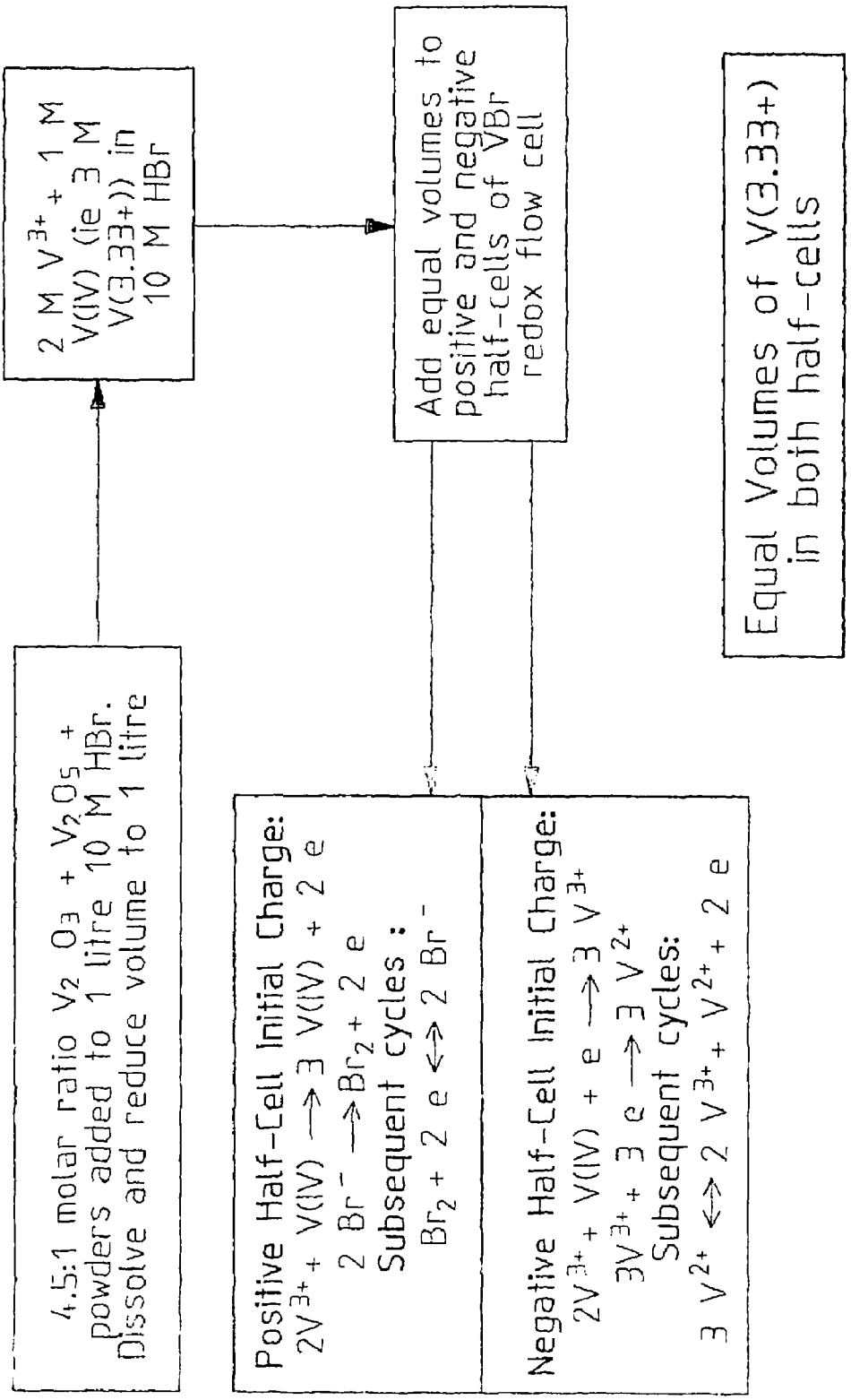
FIG. 2 illustrates the preparation and use of equal volumes of a V(3.33+) bromide electrolyte as feed solutions for the positive and negative half-cells of the vanadium redox flow cell. Incomplete reaction of the $V^{2+}$ ions in the negative half-cell during discharge is demonstrated.
Figure 3:
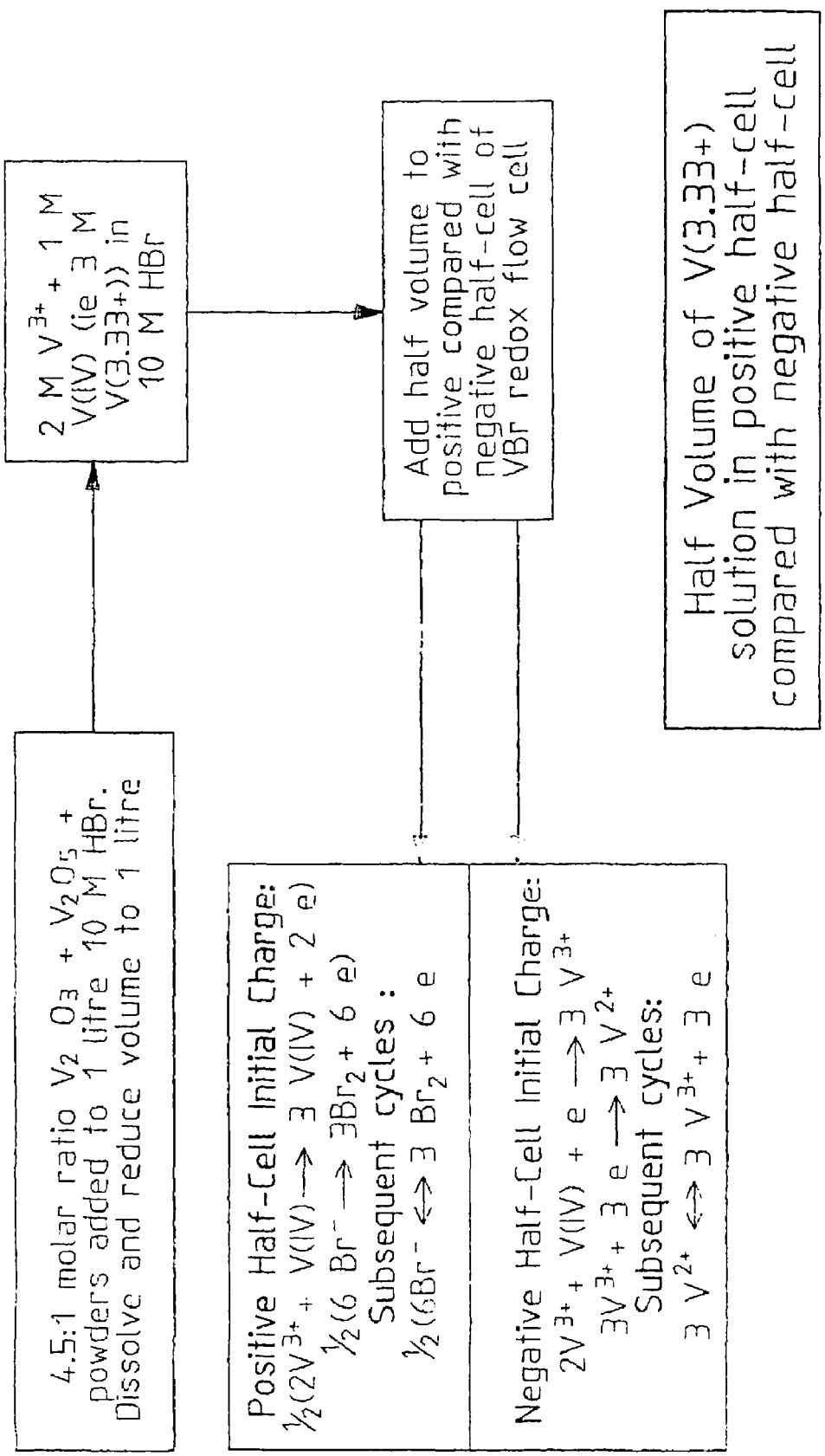
FIG. 3 illustrates the effect of using half the V(3.33+) bromide electrolyte volume in the positive half-cell compared with the negative half-cell. All of the $V^{2+}$ ions in the negative half-cell are reacted during discharge and twice the amount of the available bromide ions are reversibly oxidised and reduced in the positive half-cell during charging and discharging respectively.
Figure 4:
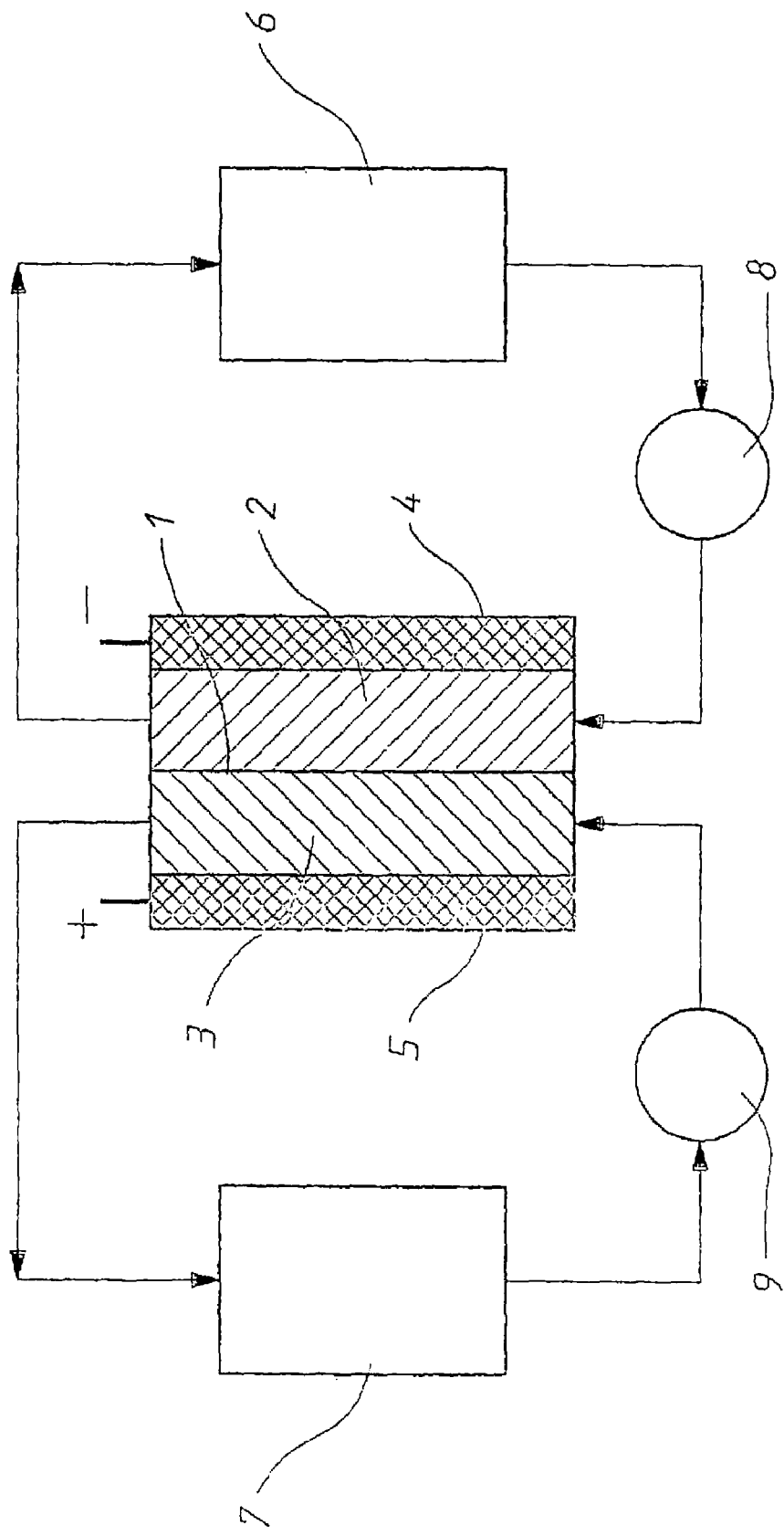
FIG. 4 illustrates a vanadium bromide redox cell employing an ion exchange membrane (1) to separate the negative and positive half-cell compartments. Each half-cell includes a porous graphite felt or matte as the negative (2) or positive (3) flow-through electrode, each making electrical contact with a conducting substrate or current collector (4 and 5). The negative and positive electrolyte half-cell solutions are stored in separate external reservoirs (6 and 7) and pumps 8 and 9 are used to pump the electrolytes through the corresponding half-cells where the charge-discharge reactions occur.
Figure 5:
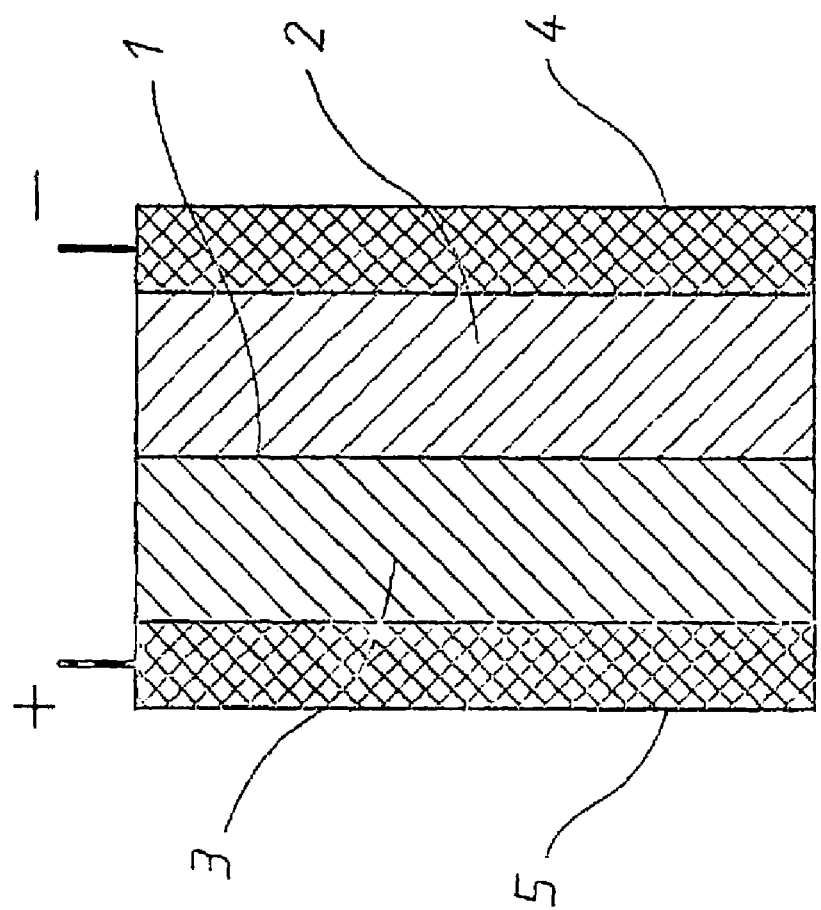
FIG. 5 illustrates a static gelled electrolyte redox cell employing a membrane (1) to separate the positive and negative half-cells. Each half-cell contains a graphite felt porous electrode impregnated with the V(3.5+) vanadium bromide electrolyte that also contains sufficient fumed silica such that a gel is formed in both the negative (2) and positive (3) half-cell graphite felt electrodes when allowed to set. The graphite felt electrodes make electrical contact to a conducting substrate that is used as current collector in both the negative (4) and positive (5) half-cells.
Figure 9:
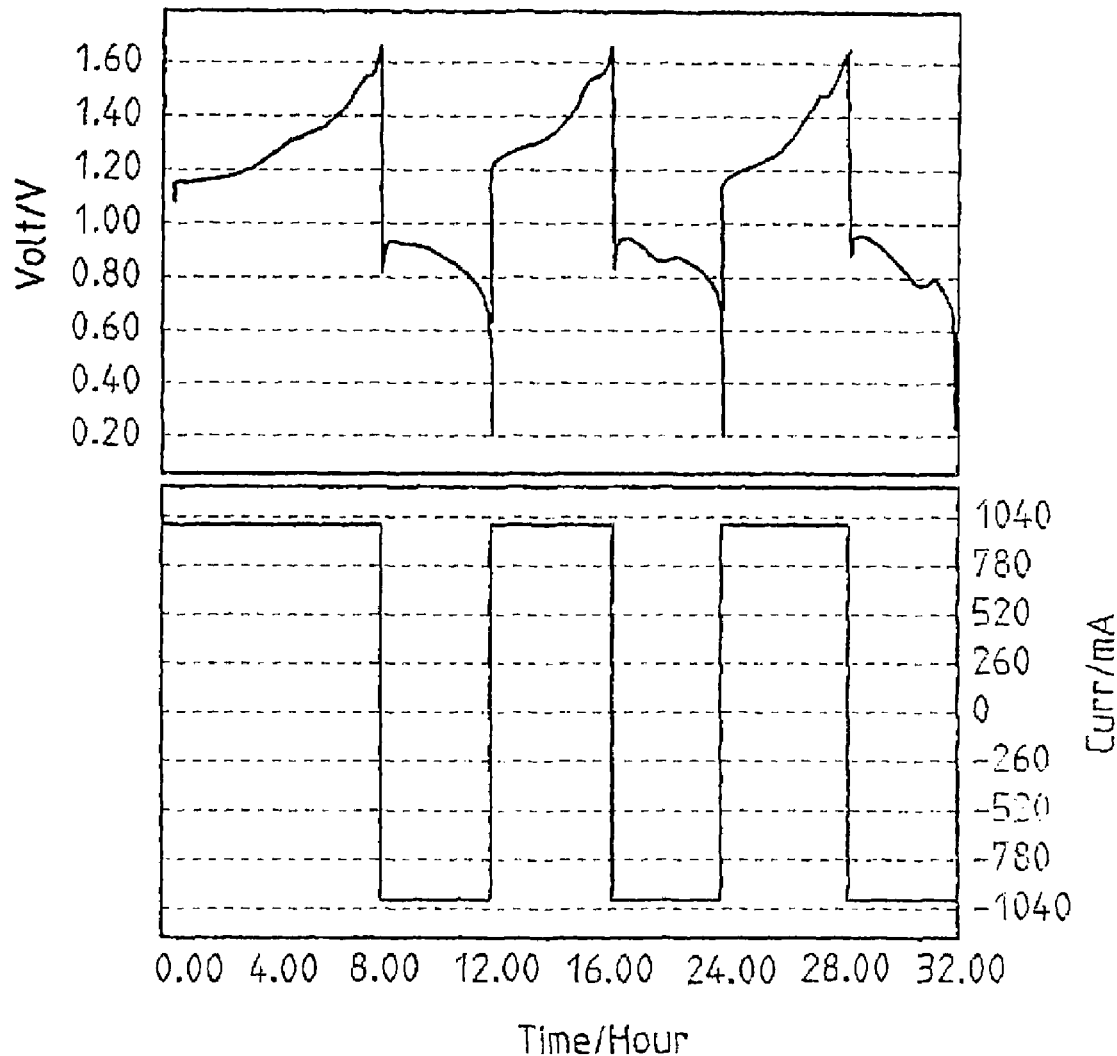
FIG. 9 is the cell voltage versus time plot for the charge-discharge cycling of a vanadium halide redox flow cell containing 55 ml of an initially 2 M V(3.33+) in 8 M $Br^-$ feed solution in the positive half-cell and 110 mls of 2 M V(3.33+) in 8 M $Br^-$ feed solution in the negative half-cell. Electrode area=25 $cm^2$, charging and discharging current=1 Amp

A 250 ml volume of 2 M V(3.33+) solution was prepared by the chemical dissolution of a 4.5 to 1 molar ratio of vanadium trioxide and vanadium pentoxide powders in 8 M HBr. This involved heating the 8 M HBr solution to approximately 60° C. and with reluxing, slowly adding 30.75 g $V_2O_3$ powder until most had dissolved. This was followed by the slow addition of 8.2 g $V_2O_5$ powder and mixing for around an hour with refluxing until fully dissolved. The final solution was cooled, filtered and then added to both sides of the same vanadium halide redox flow cell as in Example 6. In this case, however, 110 mls of the 2 M V(3.3+) solution was added to the negative half-cell while only 55 ml of the same solution was added to the positive side.
FIG. 9 shows the cell voltage versus time curves obtained during the charging and discharging cycling of the cell at a constant current of 1.0 Amp. Unlike the curves of FIG. 3, more than one step is observed in the charging curves, this indicating that the initial feed solution is not exactly 2:1 V(III) to V(IV), so that a slight imbalance occurs during both charging and discharging of the cell. This is probably due to the fact that the vanadium trioxide powder used in the preparation of this solution had partially oxidised to $V_2O_4$ during storage, so that the final solution prepared would have had a higher V(IV) content than expected. This imbalance in the vanadium ion ratio, thus means that during each charge cycle, the positive side becomes overcharged, forming more bromine or tribromide ions than expected so that the unusual discharge behaviour of FIG. 4 results.
The theoretical initial charge time for this cell, assuming a 2:1 ratio of V(III) to V(IV) and complete reaction of the vanadium ions in the negative half-cell was calculated as 8.85 hours. This compares with measured initial charge time of 8.8 hours. The charge and discharge times of subsequent cycles were measured as 5.2 and 4.6 hours respectively over the applied voltage limits, as seen in FIG. 9. The coulombic efficiency was therefore calculated as over 88%. Furthermore the measured discharge time of this cell represents 84% of that obtained in the cell of FIG. 3 that employed twice the solution volume in the positive half-cell.

EXAMPLE 8

A gelled vanadium bromide electrolyte was tested in a static cell and its performance compared to the ungelled solution. The following procedure is used to prepare a gelled vanadium bromide solution:
Approximately 50 g of solution containing 2M vanadium (3.5+), 6.4M HBr and 2M HCl was added to a 250 mL beaker and 2.5 g (5% wt) of fumed silica (Aerosil 300) was added to the beaker. The components were mixed with a hand-held mixer for 1 minute and allowed to set for 10 minutes. The gel was transferred into a sealed glass jar.

To construct the static cell, a copper electrode was attached to the plastic cell casing. The copper electrode was then placed together with the glassy carbon to form a conductive surface. A rubber frame was stuck onto the glassy carbon sheet and a piece of carbon felt was cut to fit inside the rubber frame. All these components were attached using silicon glue. This felt was covered with the membrane, which was attached to the rubber frame using the silica glue. This setup was repeated and attached to the opposite side of the membrane.

Prior to cell construction, the carbon felt had to be soaked with the V(3.5+) solution with fumed silica, in a vacuum oven for 25 minutes at room temperature. The impregnation was conducted before the solution had time to gel. If gelling had occurred, however, simple shaking of the gelled solution allowed the liquid state to be restored so that impregnation of the felt could take place. The volume of solution/gel that did not soak into the felt was measured before the felt was inserted into the rubber frame as mentioned above. The completed cell was bolted together and connected to a power source and recorder.

Figure 10:
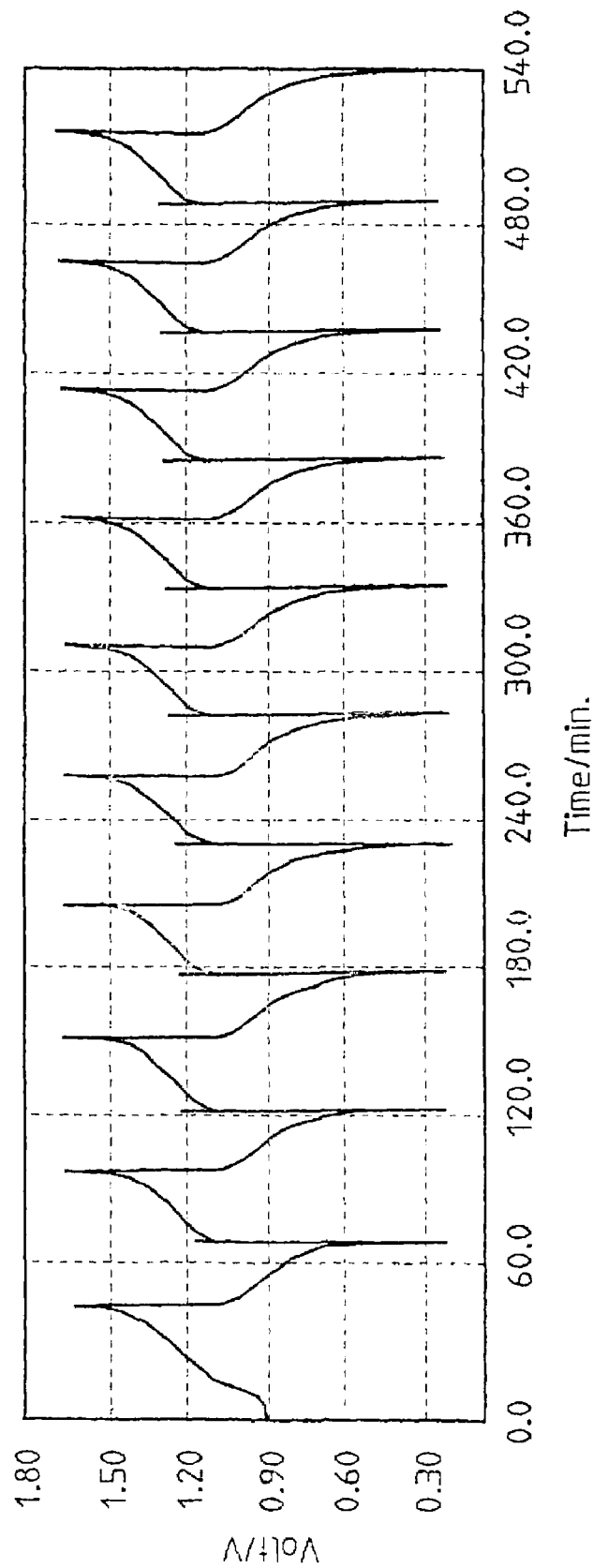
FIG. 10 shows the vanadium bromide static cell tests containing 2 M vanadium (3.5+) bromide electrolytes gelled with fumed silica.

FIG. 10 shows the charge-discharge curves obtained for the static cell employing the gelled vanadium bromide electrolytes.

EXAMPLE 9

The effectiveness of polyethylene glycol (PEG) as complexing agent for the bromine produced in the positive half-cell during charging was evaluated. A cell was assembled using the L-Gore 01854 membrane and FMI (USA) graphite felt electrodes pressed against glassy carbon substrates and a copper current collector. Charge-discharge cycling of this cell was performed with the following electrolytes:
1) 2M vanadium (3.5+) in 8 M HBr
2) a solution containing 50 mL of PEG and 50 mL of 2M vanadium (3.5+) in 8 M HBr
3) a solution containing 25 mL of PEG and 75 mL of 2M vanadium (3.5+) in 8 M HBr Prior to cell startup, 40 mL of the solution to be tested was poured into each of the two reservoirs. The pumps were turned on and the solution was allowed to circulate for 1 hour.

Figure 11A:
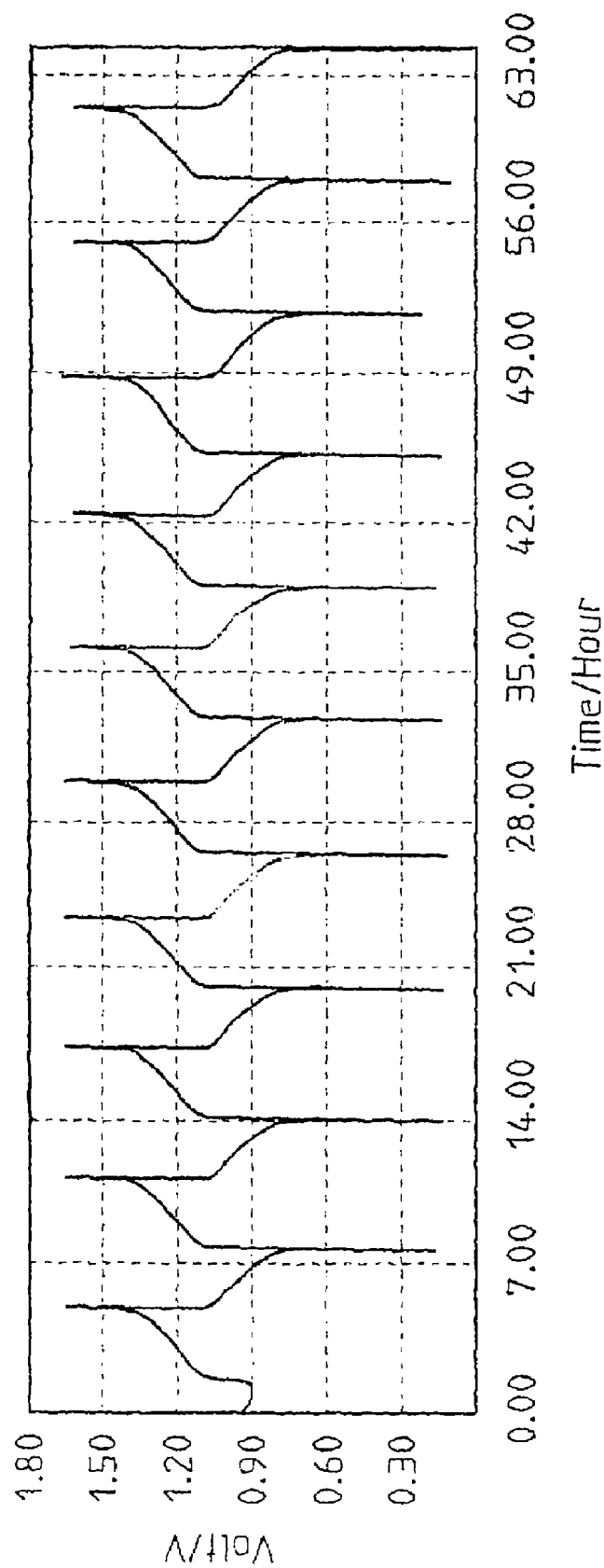
FIG. 11A shows Charge-Discharge curves for a V/Br cell containing 2 M V(3.5+) in 8 M HBr as initial feed solution.
Figure 11B:
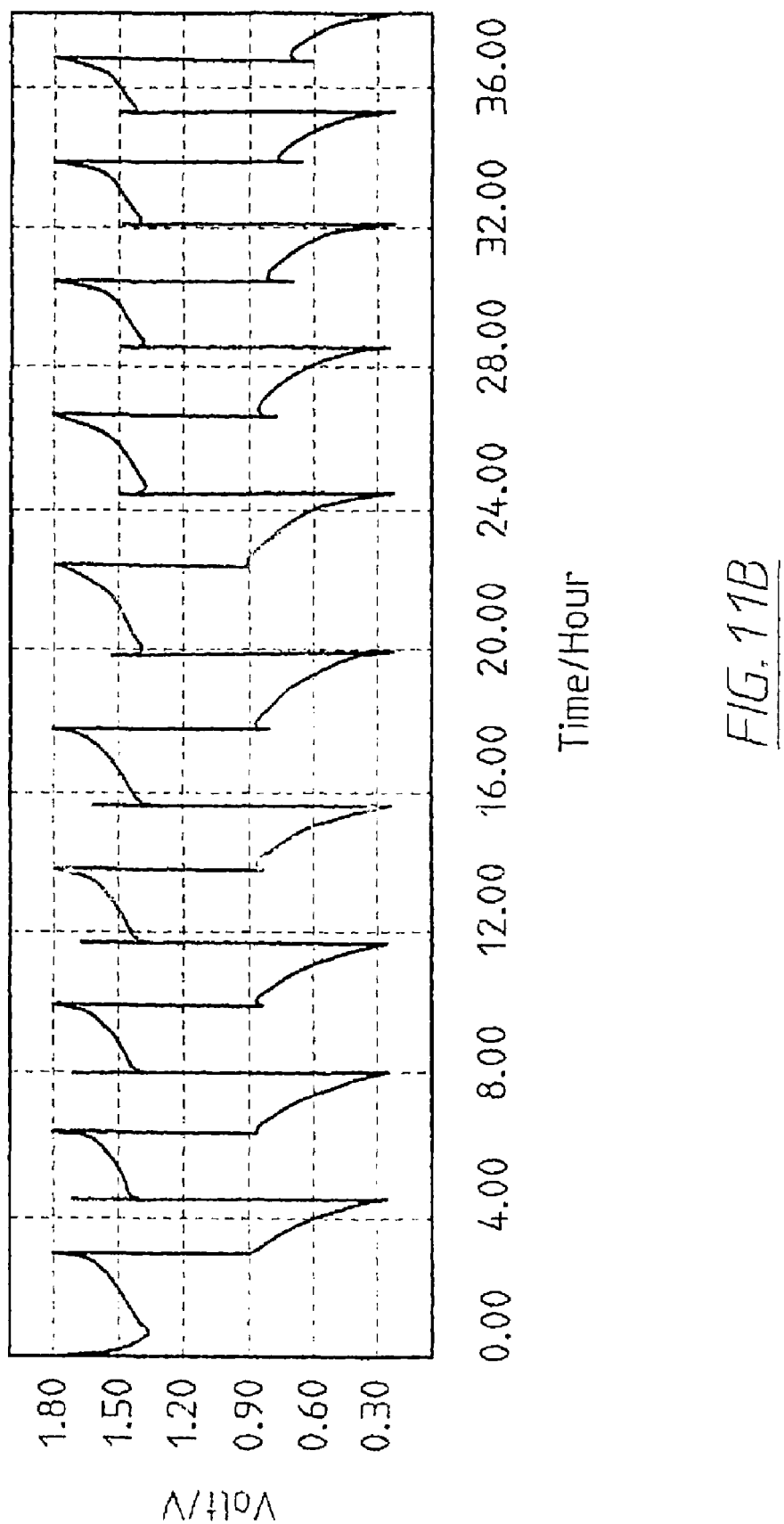
FIG. 11B shows Charge-Discharge curves for V/Br cell containing 75 vol % 2 M V(3.5+) in 8 M HBr plus 25 vol % polyethylene glycol as initial feed solution.
Figure 11C:
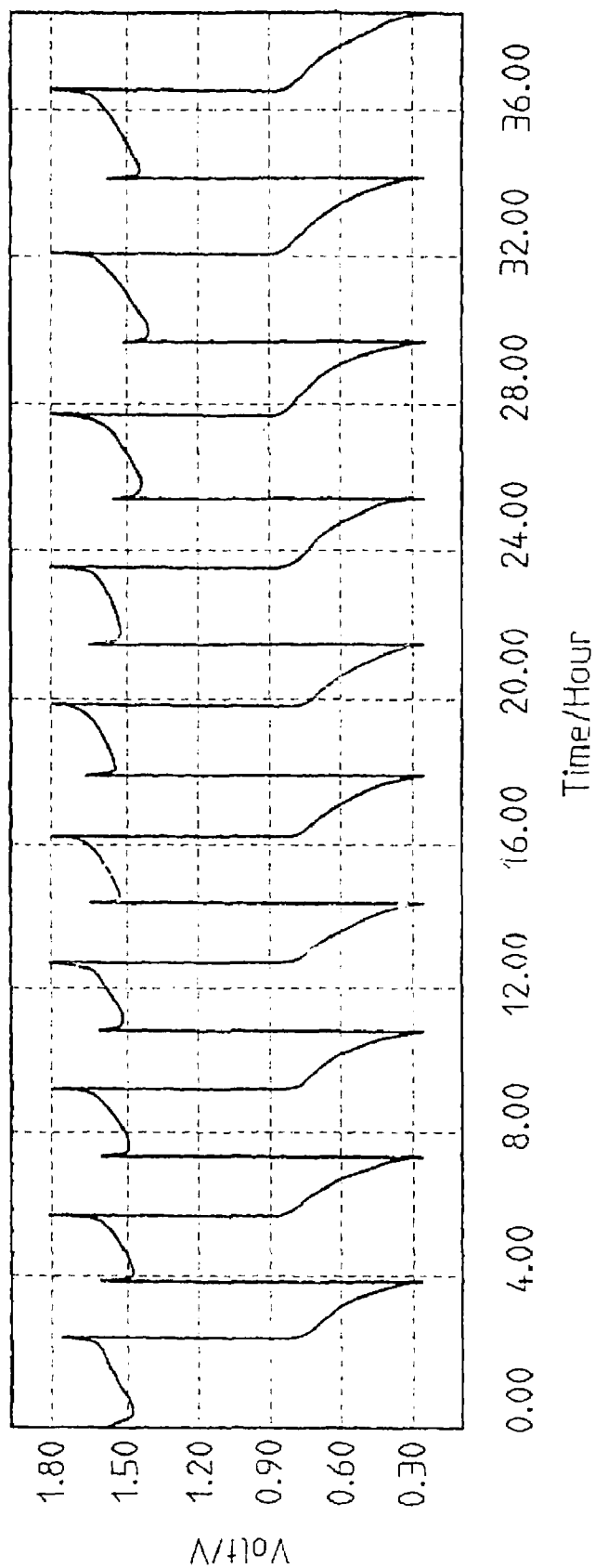
FIG. 11C shows Charge-Discharge curves for V/Br cell containing 50 vol % 2 M V(3.5+) in 8 M HBr plus 50 vol % polyethylene glycol as initial feed solution.

From FIGS. 11A, 11B and 11C, the average coulombic efficiencies of all of the solutions are seen to be approximately 90%. From these results it can be concluded that the addition of the PEG to the 2M vanadium bromide solution did not have a significant effect on coulombic efficiency. The two cells with solutions that contained PEG both had much lower average voltage efficiencies in comparison with the solution that did not have any PEG present however. It is suspected that the decreased voltage efficiency is due to an increase in resistance in the solutions containing the PEG due to the increased the viscosity of the PEG containing electrolyte solutions.

Although the voltage efficiency did decrease in the presence of 25% and 50% PEG, however, it is important to note that during cycling, the cells containing PEG showed no bromine vapours, while that containing no PEG, showed significant amounts of bromine vapour in the electrolyte containers and tubes. PEG is therefore very effective in binding bromine to prevent or minimise the formation of vapours in the cell. By reducing the concentration of the PEG, it should be possible to reduce

The invention claimed is:

1. A charged or partially charged vanadium halide redox cell which comprises:
    a positive half cell containing a positive half cell solution comprising a halide electrolyte, a polyhalide complex and vanadium (IV) halide;
    a negative half cell containing a negative half cell solution comprising the halide electrolyte, vanadium (II) halide and vanadium (III) halide;
    wherein the ratio of the number of moles of polyhalide complex:number of moles of vanadium (II) halide is stoichiometrically balanced and wherein the ratio of the number of moles of polyhalide complex:the number of moles of vanadium (II) halide is in the range of from 0.7:2 to 1.3:2.

2. The vanadium halide redox cell according to claim 1 wherein:
    each halide independently is selected from the group consisting of bromide and a combination of bromide and chloride; and wherein
    the concentration of bromide ions is greater than the concentration of chloride ions; and wherein
    the total halide ion concentration is at least 3 times the total vanadium ion concentration.

3. The vanadium halide redox cell according to claim 1 wherein each halide comprises bromide and the positive half-cell solution also contains a complexing agent for bromine.

4. The vanadium halide redox cell according to claim 3 wherein the positive half-cell solution and the negative half-cell solution are immobilised or gelled.

5. The vanadium halide redox cell according to claim 1 in which the total vanadium ion concentrations in the positive half-cell solution and the negative half-cell solution are each in the range 0.5 M to 5M.

6. The vanadium halide redox cell according to claim 5 wherein the initial feed solution used in both the positive half-cell and the negative half-cell comprise V(III) and V(IV) ions in a molar ratio from 1.8:1 to 2.2:1 and wherein the ratio of the volume of the negative half-cell solution to the volume of the positive half-cell solution is in the range 1.8:1 to 2.2:1.

7. The vanadium halide redox cell according to claim 1 wherein the positive and negative half-cell solutions have a total vanadium ion concentration between 0.5 M and 5 M and the total bromide ion concentration is between 2 M and 12 M.

8. The vanadium halide redox cell according to claim 7 in which the positive and negative half-cell solutions also contain chloride ions at a concentration of 0.5 M to 3 M.

9. The vanadium halide redox cell of claim 5 wherein the halide electrolyte is selected from the group consisting of HBr, LiBr, NaBr, KBr and a mixture of any two or more thereof.

10. The vanadium halide redox cell according to claim 1 wherein the positive and negative half-cell solutions are each produced by:
    dissolving a V(III) compound and a V(V) compound in a 3:1 molar ratio in a solution of HBr, LiBr, NaBr, KBr or a mixture of any two or more thereof to produce an approximately 50:50 mixture of V(III) and V(IV) ions in the solution.

11. The vanadium halide redox cell according to claim 6 wherein the positive and negative half-cell solutions are each produced by:
    dissolving $V_2O_3$ and $V_2O_5$ powders in a molar ratio in the range 2.8:1 to 3.2:1 in a solution of HBr, LiBr, NaBr, KBr or a mixture of any two or more thereof to produce a mixture of V(III) and V(IV) ions in the solution.

12. The vanadium halide redox cell according to claim 1 wherein the positive and negative half-cell solutions are produced by:
  dissolving equimolar amounts of a V(III) compound and a V(IV) compound in a solution of HBr, LiBr, NaBr, KBr or a mixture of any two or more thereof to produce an approximately 50:50 mixture of V(III) and V(IV) ions.

13. The vanadium halide redox cell according to claim 12, wherein the V(III) compound used to produce the positive and negative half-cell solutions is $V_2O_3$ and the V(IV) compound is $V_2O_4$.

14. The vanadium halide redox cell according to claim 12, wherein the positive and negative half-cell solutions produced also contain chloride ions.

15. The vanadium halide redox cell according to claim 10, wherein the positive and negative half-cell solutions produced also contain chloride ions.

16. The vanadium halide redox cell according to claim 1 wherein the positive and negative half-cell solutions are each produced by:
  dissolving a V(III) compound and a V(V) compound in a 4.5:1 molar ratio in a solution of HBr, LiBr, NaBr, KBr or a mixture of any two or more thereof to produce a 2:1 mixture of V(III) and V(IV) ions.

17. The vanadium halide redox cell of claim 16 wherein the positive and negative half-cell solutions are each produced by:
  dissolving $V_2O_3$ and $V_2O_5$ powders in a molar ratio range between 4:1 to 4.9:1 in a solution of HBr, LiBr, NaBr, KBr or a mixture of any two or more thereof to produce an approximately 2:1 mixture of V(III) and V(IV) ions in the solution.

18. The vanadium halide redox cell according to claim 1 wherein the positive and negative half-cell solutions are each produced by:
  dissolving a 2:1 molar ratio of a V(III) compound and a V(IV) compound in a solution of HBr, LiBr, NaBr, KBr or a mixture of any two or more thereof to produce a 2:1 mixture of V(III) and V(IV) ions.

19. The vanadium halide redox cell according to claim 18 wherein the V(III) compound used to produce the halide electrolyte is $V_2O_3$ and the V(IV) compound is $V_2O_4$.

* * * * *